United States Patent
Tsutsumi et al.

(10) Patent No.: US 9,923,968 B2
(45) Date of Patent: Mar. 20, 2018

(54) NETWORK SYSTEM AND CONTROL METHOD OF A NETWORK SYSTEM, AND A CONTROL DEVICE

(71) Applicant: Seiko Epson Corporation, Tokyo (JP)

(72) Inventors: Koichiro Tsutsumi, London (GB); Junichi Yoshizawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 15/135,968

(22) Filed: Apr. 22, 2016

(65) Prior Publication Data
US 2016/0323289 A1    Nov. 3, 2016

(30) Foreign Application Priority Data
Apr. 30, 2015    (JP) .................................. 2015-092867

(51) Int. Cl.
*H04L 29/06*    (2006.01)
*H04L 29/08*    (2006.01)

(52) U.S. Cl.
CPC .......... *H04L 67/1095* (2013.01); *H04L 63/08* (2013.01); *H04L 63/108* (2013.01)

(58) Field of Classification Search
CPC .......... H04L 63/08; H04L 63/10; G06F 21/30
See application file for complete search history.

(56) References Cited

U.S. PATENT DOCUMENTS 9,154,304 B1 *   10/2015   Dotan ................... H04L 9/3226

FOREIGN PATENT DOCUMENTS

| JP | 2001-344208 A | 12/2001 |
| JP | 2002-007345 A | 1/2002 |
| JP | 2005-250665 A | 9/2005 |
| JP | 2006-079408 A | 3/2006 |

* cited by examiner

*Primary Examiner* — Izunna Okeke
(74) *Attorney, Agent, or Firm* — Foley & Lardner LLP

(57) ABSTRACT

In a system having a control server and a control device that connects to the control server through a global network, the control device can appropriately handle processing when normal communication with the control server is not possible. The POS terminal 10 of a transaction processing system 1 has a client-function unit 501 configured to send authentication information to a control server 15 and request authentication, and acquire and store an access code generated by the control server 15 when authentication is successful. When normal communication is not possible with the control server 15, the client-function unit 501 communicates with the server-function unit 502 as a client of the server-function unit 502 based on the stored access code, and executes processes with the server-function unit 502.

6 Claims, 13 Drawing Sheets

NETWORK SYSTEM AND CONTROL METHOD OF A NETWORK SYSTEM, AND A CONTROL DEVICE

BACKGROUND

1. Technical Field

The present invention relates to a network system and a control method of a network system, and a control device.

2. Related Art

Systems in which a control server (server) generates (issues) an access code, and the access code generated by the server is used to connect to the server, are known from the literature. See, for example, JP-A-2005-250665. More recently, network systems (cloud systems) in which a server (a cloud server) connected to a global network such as the Internet executes a process in response to a request from a client have become common.

By using the technology described in JP-A-2005-250665 in a cloud system, the need to input authentication information (such as an ID and a password) can be eliminated by a control device functioning as a client device using the access code to connect to the control server (server), improving the ease of accessing the server. However, the control device (client) cannot communicate normally with the control server in certain events, there is a need to handle such events appropriately.

SUMMARY

A system having a control server and a control device that connects to the control server through a global network according to the invention can appropriately handle situations in which the control device cannot communicate normally with the control server.

A network system according to the invention includes a control server with a server function that connects to a global network; and a control device configured to communicate with the server through the global network. The control server is configured to authenticate the control device based on authentication information received from the control device in response to an authentication request from the control device, and if authentication is successful, generate and send an access code to the control device, and store the access code as an access code for server-side authentication. The control device has a server-function unit with a server function; a synchronization processor configured to communicate with the control server, acquire an access code generated by the control server, store the acquired access code as an access code for control device-side authentication in a storage area that can be read by the server-function unit, and communicate with the control server to synchronize the access code for server-side authentication and the access code for control device-side authentication; and a client-function unit configured to send authentication information to the control server and request authentication, and acquire and store the access code generated by the control server if authentication is successful, when normal communication with the control server is possible, communicate with the control server as a client of the control server based on the stored access code and execute a process with the control server, and when normal communication with the control server is not possible, communicate with the server-function unit as a client of the server-function unit based on the stored access code, and execute a process with the server-function unit.

In a system according to the invention having a control server and a control device that connects to the control server through a global network, the control device can appropriately handle processing when the control device cannot communicate normally with the control server.

In a network system according to another aspect of the invention, when illegally accessed by a control device, or when the control device executes an illegal process, the control server deletes the stored access code for server-side authentication.

Thus comprised, control devices illegally accessing the control server, and control devices executing illegal processes, can be prevented from executing processes using a function of the control server.

In a network system according to another aspect of the invention, when accessed by the control device based on an access code during a specific time period, the control server determines if authentication of the control device has been completed based on the access code; and when accessed from the control device with the access code outside the specific time period, the control server requests the control device to send authentication information.

Thus comprised, a POS terminal 10 that may be attempting to illegally access the server can be prevented from executing processes using a function of the control server 15.

In a network system according to another aspect of the invention, the control device has a recording function for recording on recording media; and the client-function unit of the control device communicates with the control server or the server-function unit to execute the transaction process and produce a receipt.

In a system thus comprised with control device having a function for executing a transaction process and produce a receipt, and a control server that communicates with the control device through a global network, the control device can appropriately handle events in which the control device cannot communicate normally with the control server.

In a network system according to another aspect of the invention, a recording device with a recording function to record on recording media is connected to the control device; and the client-function unit of the control device communicates with the control server or the server-function unit to execute the transaction process and causes the recording device to produce a receipt.

In a system thus comprised with control device that connects to a recording device, executes a transaction process, and produces a receipt with the recording device, and a control server that connects to the control device through a global network, the control device can appropriately handle events in which the control device cannot communicate normally with the control server.

Another aspect of the invention is a control method of a network system including a control server with a server function that connects to a global network, and a control device configured to communicate with the server through the global network and having a client-function unit, server-function unit, and synchronization processor, the control method including steps of: the client-function unit of the control device sending authentication information to the control server and requesting authentication; the control server authenticating the control device based on authentication information received from the control device in response to an authentication request from the control device, and if authentication is successful, generating and sending an access code to the control device, and storing the access code as an access code for server-side authentication;

the client-function unit of the control device acquiring and storing the access code generated by the control server if authentication is successful; the synchronization process of the control device communicating with the control server, acquiring the access code generated by the control server, storing the acquired access code as an access code for control device-side authentication in a storage area that can be read by the server-function unit, and communicating with the control server to synchronize the access code for server-side authentication and the access code for control device-side authentication; when normal communication with the control server is possible, the client-function unit of the control device communicating with the control server as a client of the control server based on the stored access code and executing a process with the control server; and when normal communication with the control server is not possible, communicating with the server-function unit as a client of the server-function unit having a server function based on the stored access code, and execute a process with the server-function unit.

In a system according to this aspect of the invention having a control server and a control device that connects to the control server through a global network, the control device can appropriately handle processing when the control device cannot communicate normally with the control server.

Another aspect of the invention is a control device including: a server-function unit with a server function; a client-function unit configured to send authentication information to a control server connected to a global network and request authentication, and acquire and store an access code generated by the control server if authentication is successful; and a synchronization processor configured to communicate with the control server, acquire an access code generated by the control server, store the acquired access code as an access code for control device-side authentication in a storage area that can be read by the server-function unit, and communicate with the control server to synchronize an access code managed by the control server with the access code for control device-side authentication; wherein when normal communication with the control server is possible, the client-function unit communicates with the control server as a client of the control server based on the stored access code and executes a process with the control server, and when normal communication with the control server is not possible, the client-function unit communicates with the server-function unit as a client of the server-function unit based on the stored access code, and executes a process with the server-function unit.

In a system according to the invention having a control server and a control device that connects to the control server through a global network, the control device can appropriately handle processing when the control device cannot communicate normally with the control server.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
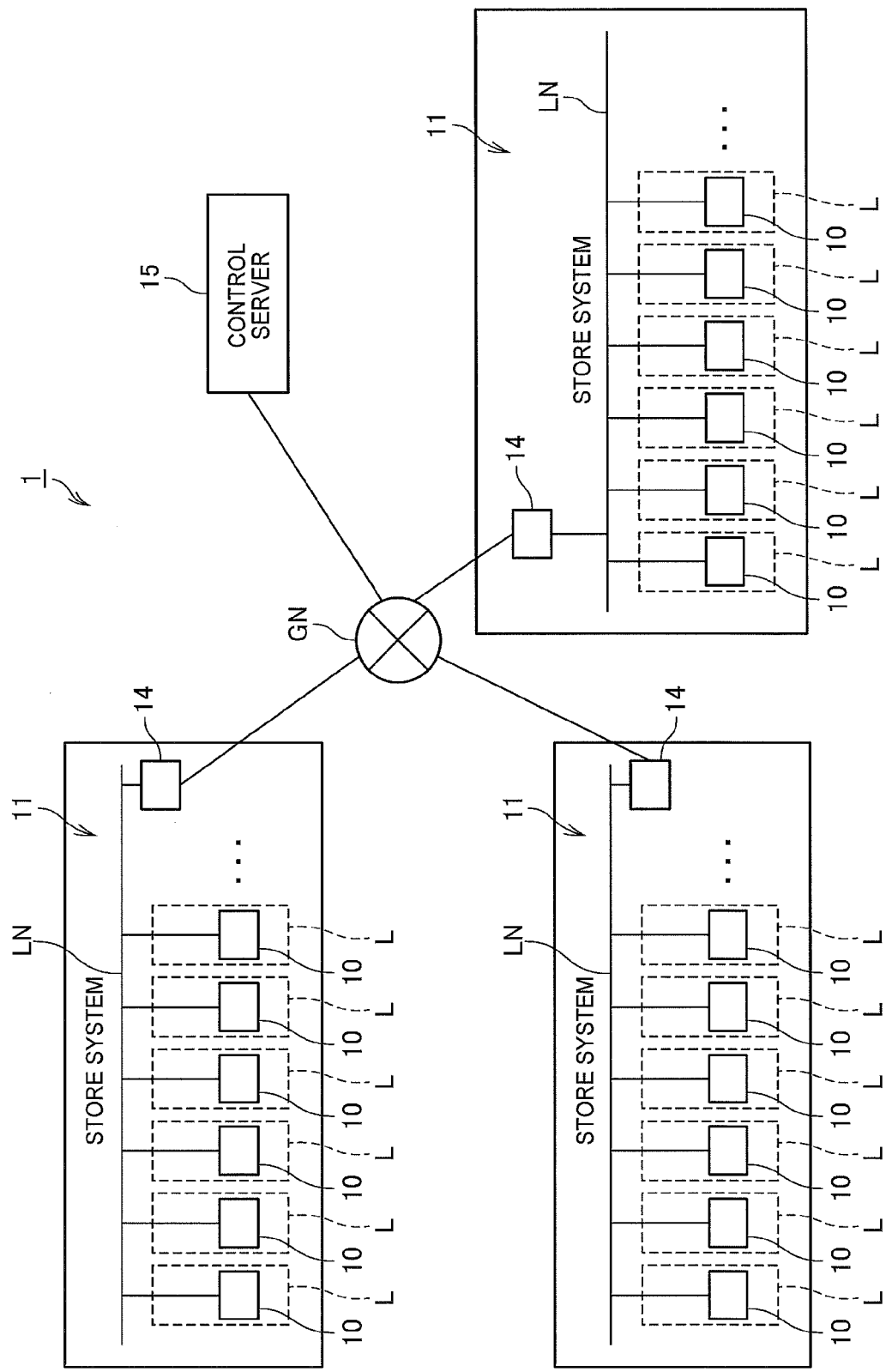
FIG. 1 illustrates the configuration of a network system related to a preferred embodiment of the invention.

FIG. 1 shows the configuration of a transaction processing system 1 (network system) according to a preferred embodiment of the invention.

As shown in FIG. 1, the transaction processing system 1 includes a plurality of store systems 11. A store system 11 is a system that is used in retail businesses such as supermarkets, convenience stores, department stores, and restaurants.

The store system 11 has functions for processing transactions according to the products purchased by customers, and producing sales (transaction) receipts based on the transactions.

A checkout counter L where customer transactions are processed is located in the business where the store system 11 is deployed. A POS terminal 10 (control device) that can produce receipts appropriate to the transaction is installed at each checkout counter L.

The POS terminal 10 has functions for executing a transaction process appropriate to the transaction performed at the checkout counter L, and producing receipts recorded with information related to the transaction. The receipt produced by the POS terminal 10 is then given to the customer.

The configuration and functions of the POS terminal 10, and processes based on the functions of the POS terminal 10, are described further below.

The store system 11 also has a local area network LN.

The POS terminal 10 connects to the local area network LN according to a communication protocol appropriate to the LAN. Any suitable communication protocol may be used by the POS terminal 10 to connect to the local area network LN, and a wired or wireless connection may be used.

A communication device 14 is also connected to the local area network LN. The communication device 14 is an interface device that connects the local area network LN to a global network GN (network) such as the Internet. The communication device 14 has the functions of a modem (or ONU (Optical Network Unit)), a router, a DHCP (Dynamic Host Configuration Protocol) server, and a NAT (Network Address Translation) unit. The communication device 14 passes data between devices when a device connected to the local area network LN and a device connected to the global network GN communicate with each other. Note that the communication device 14 is represented by a single function block in FIG. 1, but the communication device 14 may comprise plural devices with different functions.

The POS terminal 10 can also access the global network GN through the communication device 14.

A control server 15 (server) connects to the global network GN. The control server 15 has a server function, and is a cloud server in a cloud system in which the POS terminal 10 is a client. More specifically, when triggered by a request from a client device, for example, the control server 15 runs a specific operating process and sends data based on the result of the process to the client. Note that the control server 15 is represented by a single function block in FIG. 1, but this does not mean that the control server 15 is embodied by a single server device. For example, the control server 15 may include a plurality of server devices. More specifically, the control server 15 may be any configuration that can execute the processes described below.

Figure 2:
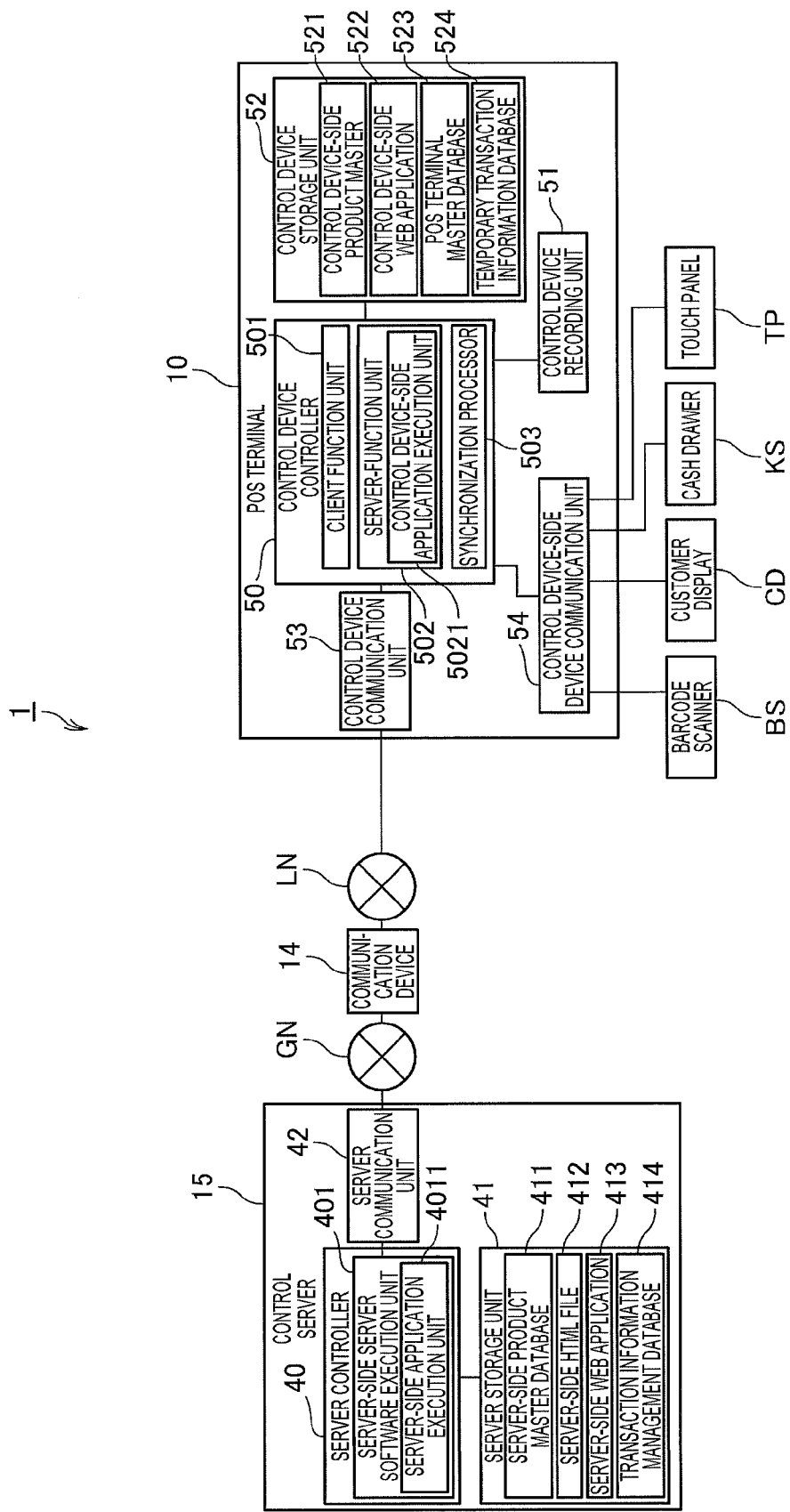
FIG. 2 is a block diagram illustrating the functional configuration of devices in the network system.

FIG. 2 is a block diagram illustrating the functional configuration of the POS terminal 10 and control server 15 in the transaction processing system 1.

The POS terminal 10 is a thermal line printer that stores roll paper (recording medium) and records images by forming dots with a thermal line head on the roll paper.

As shown in FIG. 2, the POS terminal 10 has a control device controller 50, a control device recording unit 51, a control device storage unit 52, a control device communication unit 53, and a control device-side device communication unit 54.

The control device controller 50 has a CPU, ROM, RAM, and other peripheral circuits not shown, and controls the POS terminal 10.

The control device recording unit 51 includes mechanisms related to recording on roll paper, such as a conveyance mechanism for conveying roll paper stored inside the cabinet of the POS terminal 10, a recording mechanism for forming dots and recording images on the roll paper with a thermal head, and a cutter mechanism for cutting the roll paper at a specific position. The control device recording unit 51 conveys the roll paper with the conveyance mechanism, records receipt-related images on the roll paper with the recording mechanism, and cuts the roll paper at a specific position with the cutter mechanism as controlled by the control device controller 50 to produce a receipt.

The control device storage unit 52 has nonvolatile memory such as an EEPROM device, and stores data.

The control device storage unit 52 stores a control device-side product master database 521, which is a product master database relationally storing the product code of a product to other information related to that product. The information related to the product includes at least the price of the product.

The control device storage unit 52 also stores a control device-side web application 522. The control device-side web application 522 is described further below.

The control device storage unit 52 also stores a POS terminal master database 523. The POS terminal master database 523 is described further below.

The control device storage unit 52 also stores a temporary transaction information database 524. The temporary transaction information database 524 is described further below.

A specific web browser is installed on the POS terminal 10. The control device controller 50 functions as a client-function unit 501 by reading and running the installed web browser.

Specific web server software is also installed on the POS terminal 10. The control device controller 50 also functions as a server-function unit 502 by reading and running the installed web server software.

The control device-side web application 522 is a software application that is run by the specific web server software application installed on the POS terminal 10, and communicates with the specific web server application by interprocess communication.

The server-function unit 502 also functions as a control device-side application execution unit 5021 by reading and running the control device-side web application 522.

The server-function unit 502 has a server function, and in relationship to the client-function unit 501 functions as a server of which the client function unit 501 is a client.

A specific program with a function for synchronizing specific data between the control server 15 and the POS terminal 10 as described further below is also installed on the POS terminal 10. The control device controller 50 functions as a synchronization processor 503 by reading and running this specific program.

The functions of the function blocks of the control device controller 50, and processes based on those functions, are described further below.

The control device communication unit 53 accesses the local area network LN and communicates with devices (including other POS terminals 10) connected to the network as controlled by the control device controller 50.

The control device communication unit 53 also accesses the global network GN and communicates with devices connected to the network (including the control server 15) through the communication device 14 as controlled by the control device controller 50.

The control device-side device communication unit 54 has an interface board with a USB port, a port conforming to a non-USB serial communication standard, or ports conforming to other communication protocols. Devices can connect to each port. The control device-side device communication unit 54 communicates with devices connected to the POS terminal 10 through the corresponding port as controlled by the control device controller 50.

Note that the control device-side device communication unit 54 may also be configured with a wireless communication capability and communicate with devices wirelessly.

A barcode scanner BS, customer display CD, cash drawer KS, and touch panel TP are devices connected to the POS terminal 10.

The barcode scanner BS is used to read barcodes from products and product packaging, and outputs data representing the barcode to the control device-side device communication unit 54. The control device-side device communication unit 54 then outputs the data input from the barcode scanner BS to the control device controller 50.

The customer display CD displays images as controlled by the control device controller 50. The information presented on the customer display CD can be read by the customer involved in the transaction at the checkout counter L.

The cash drawer KS has a tray for storing cash, and a mechanism for locking the tray, and unlocks and opens the tray as controlled by the control device controller 50.

The touch panel TP has a display device such as an LCD panel or OLED panel, and a touch sensor disposed over the display device for detecting touch operations by the user (including the checkout clerk). The touch panel TP is disposed to a position at the checkout counter L where it can be read by the checkout clerk and operated by touch. The touch panel TP displays images on the display device as controlled by the control device controller 50. The client function unit 501 of the control device controller 50 can display a web page on the touch panel TP based on an HTML file acquired by a specific means. When a touch operation by the user is detected, the touch panel TP outputs a signal indicating the touched position to the control device controller 50.

Based on input from the touch panel TP, the control device controller 50 executes a process corresponding to the touch operation of the user.

As shown in FIG. 2, the control server 15 has a server controller 40, server storage unit 41, and server communication unit 42.

The server controller 40 includes a CPU, ROM, RAM, and other peripheral circuits, and controls the control server 15.

The server storage unit 41 has nonvolatile memory such as a hard disk drive or EEPROM device not shown, and stores data.

The server storage unit 41 stores a server-side product master database 411 relationally storing a product code for each product and the product price.

The server storage unit 41 stores a server-side HTML file 412, which is an HTML file. The server-side HTML file 412 is described further below.

The server storage unit 41 stores a server-side web application 413. The server-side web application 413 is described further below.

The server storage unit 41 also stores a transaction information management database 414. The transaction information management database 414 is described further below.

Specific web server software is installed on the control server 15. The server controller 40 functions as a server-side server software execution unit 401 by reading and running the installed web server software.

The server-side web application 413 is a software application that is run by the specific web server software installed on the control server 15, and communicates with the specific web server application by interprocess communication.

The server-side server software execution unit 401 also functions as a server-side application execution unit 4011 by reading and running the server-side web application 413.

The server communication unit 42 accesses the global network GN and communicates with devices connected to the network (including the POS terminal 10) as controlled by the server controller 40.

While described further below, the control server 15 has functions for communicating with external devices such as POS terminals 10 that communicate through the global network GN, and executing processes in conjunction with an external device. Therefore, to prevent an unauthorized third party from communicating with the control server 15 through a particular device and using functions of the control server 15, it is essential to enable only POS terminals 10 that have been authenticated by the control server 15 with rights to access the control server 15 from using functions of the control server 15.

Authentication is commonly done using authentication information such as a specific password and ID combination. However, problems such as described below can occur in a configuration in which the checkout clerk inputs the authentication information each time the POS terminal 10 is used, and authentication is based on the input authentication information. Specifically, because this task is tedious, and the checkout clerk using a single POS terminal 10 is not always the same person, each time a checkout clerk uses a different POS terminal 10, the checkout clerk needs to know by some means the authentication information specific to that POS terminal 10, all checkout clerks are not necessarily well trained in how to use the POS terminal 10, and inputting the authentication information can be a problem.

The POS terminal 10 therefore executes the process described below when the POS terminal 10 is introduced to a store system 11.

Figure 3:
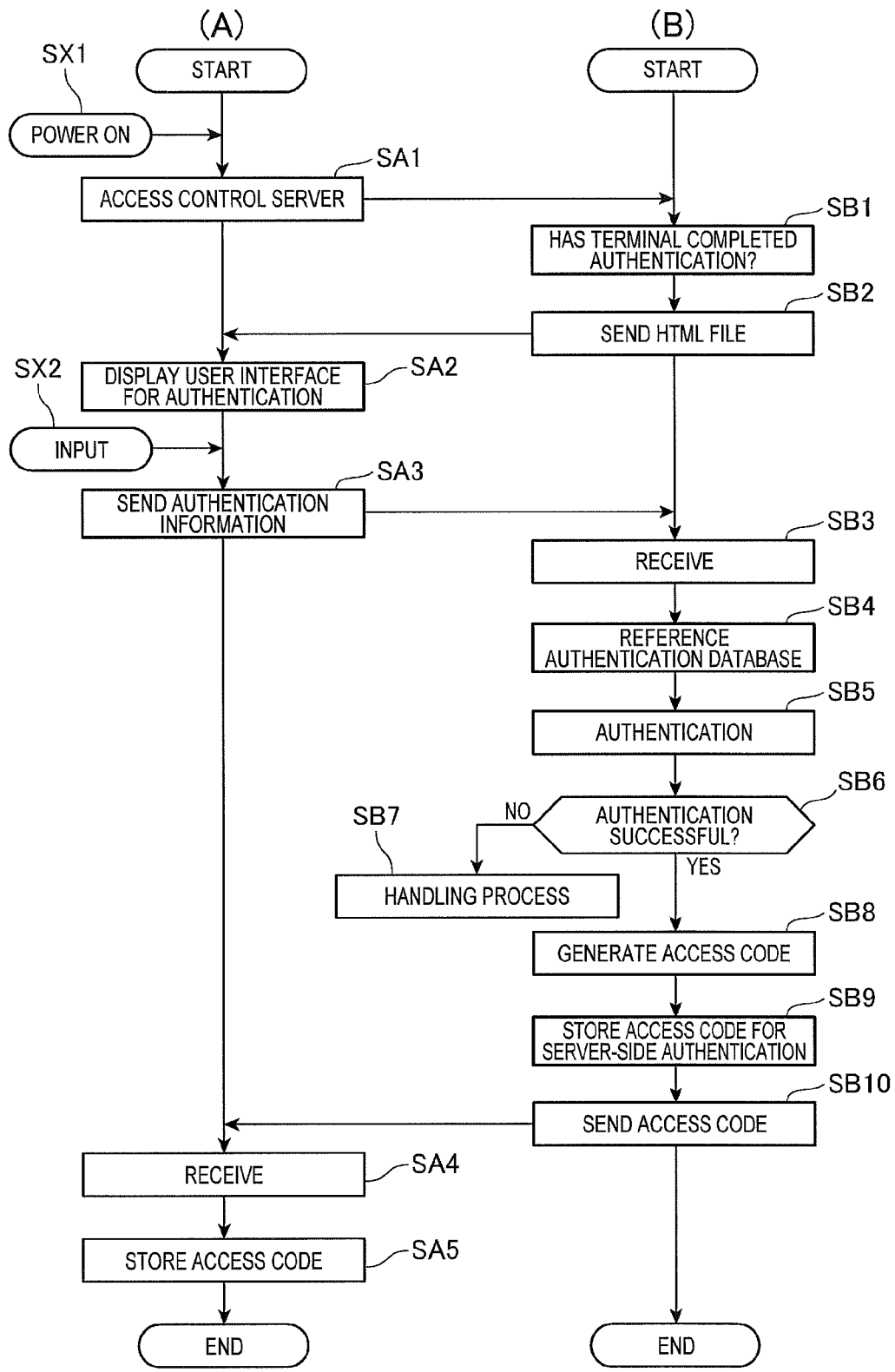
FIG. 3 is a flow chart of an operation of a POS terminal and control server.

FIG. 3 is a flow chart showing the operation of the POS terminal 10 and control server 15 when installing the POS terminal 10 to a store system 11. FIG. 3 (A) shows the operation of the POS terminal 10, and (B) shows the operation of the control server 15.

Below, the person installing the POS terminal 10 to the store system 11 is referred to as the "user."

To install a POS terminal 10 to a store system 11, the user first turns the power of the POS terminal 10 brought into the business (step SX1). Note that the POS terminal 10 does not need to actually (physically) be in the store.

The POS terminal 10 is configured to automatically start the browser and enable processing by the client-function unit 501 when the power turns on.

As shown in FIG. 3 (A), the client-function unit 501 of the POS terminal 10 accesses a specific URL on the control server 15 (step SA1). The specific URL of the control server 15 and other information required to communicate with the control server 15 is previously registered.

As shown in FIG. 3 (B), when accessed by a POS terminal 10, the server-side server software execution unit 401 of the control server 15 determines if the POS terminal 10 that accessed the control server 15 in step SA1 is a terminal that has already completed authentication (step SB1).

If authentication of the POS terminal 10 has already been completed, an access code is sent by a specific means to the control server 15 when attempting to access the control server 15. This access code is generated when authentication of the POS terminal 10 succeeds. In step SB1, the control server 15 determines if the POS terminal 10 is a terminal that has completed authentication by determining if the access attempt from the POS terminal 10 was accompanied by an access code. Note that the method of determining if a terminal has completed authentication is not so limited, and any appropriate method may be used.

In this example, the server-side server software execution unit 401 determines in step SB1 that the POS terminal 10 is a terminal that has completed authentication, and proceeds from step SB2.

In step SB2, the server-side server software execution unit 401 sends an HTML file related to displaying a user interface for authentication 70 to the POS terminal 10.

As shown in FIG. 3 (A), the client-function unit 501 of the POS terminal 10 acquires the HTML file, and based on the HTML file displays the user interface for authentication 70 on the touch panel TP (step SA2).

Figure 4:
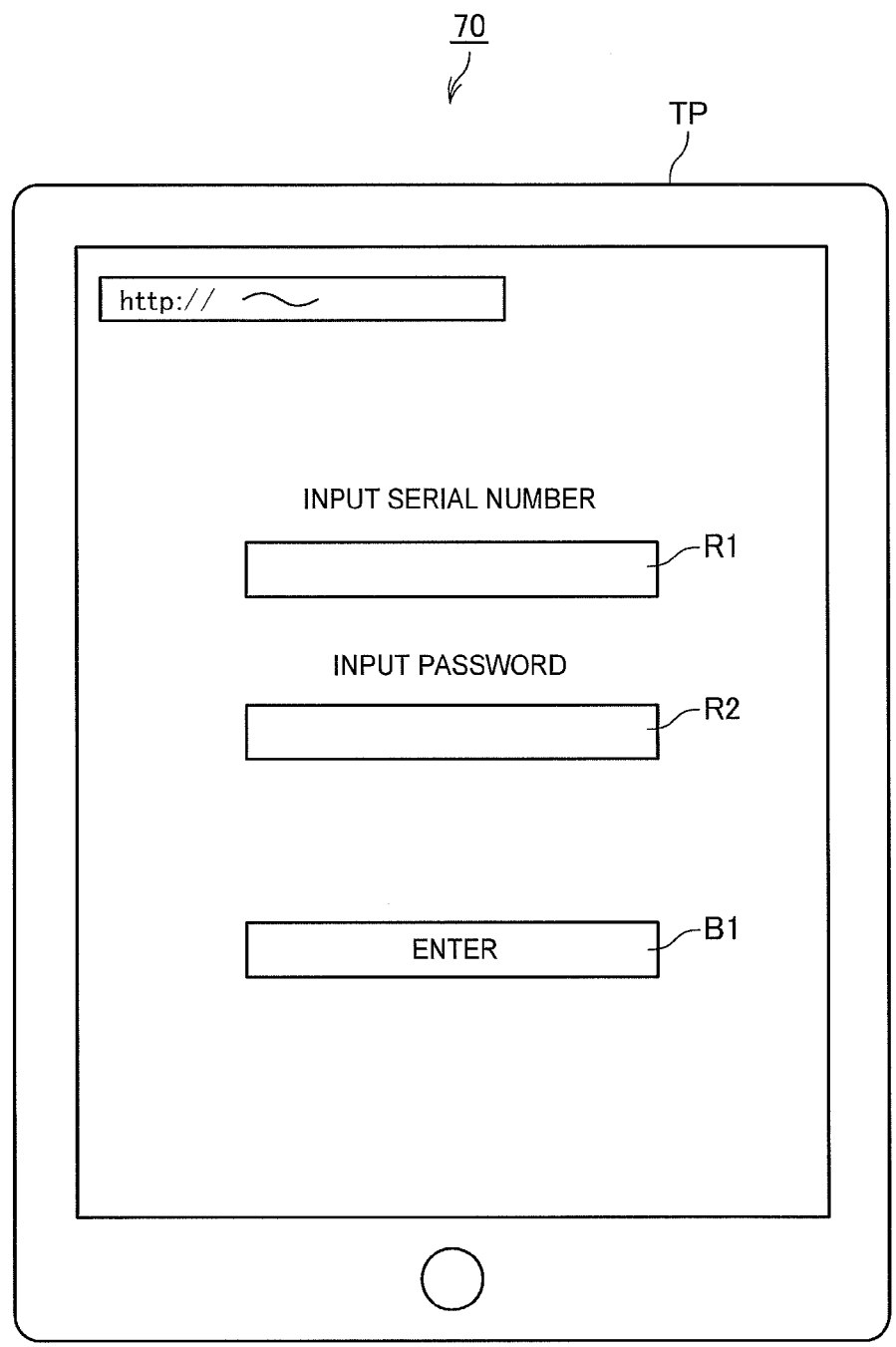
FIG. 4 shows an example of a user interface for authentication.

FIG. 4 shows an example of the user interface for authentication 70.

As shown in FIG. 4, the user interface for authentication 70 has a serial number input field R1 for inputting the serial number of the POS terminal 10, a password input field R2 for inputting the password, and an Enter button B1 for confirming input to the serial number input field R1 and input to the password input field R2. The serial number of the POS terminal 10 is identification information uniquely assigned to the POS terminal 10 when the POS terminal 10 is manufactured. The serial number is expressed in a form that can be easily read by the user. For example, a seal on which information denoting the serial number is recorded may be affixed to the cabinet of the POS terminal 10. The user (an authorized person) is previously informed of the password by a specific method.

The user inputs the serial number to the serial number input field R1 of the user interface for authentication 70, inputs the password to the password input field R2, and then operates the Enter button B1 (step SX2).

When operation of Enter button B1 is detected, the client-function unit 501 controls the control device communication unit 53 to send the input combination of serial number and password to the control server 15 (step SA3).

As shown in FIG. 3 (B), the server-side server software execution unit 401 of the control server 15 controls the server communication unit 42 to receive the input serial number and password combination (step SB3).

Next, the server-side server software execution unit 401 references the authentication database (not shown in the figure) stored by the server storage unit 41 (step SB4). The authentication database is a database relationally storing the serial numbers and passwords of POS terminals 10 that can use functions of the control server 15.

Next, the server-side server software execution unit 401 authenticates the POS terminal 10 (step SB5). In step SB5 the server-side server software execution unit 401 determines if the specific combination of serial number and password received in step SB3 is stored in the authentication database. If the specific combination of serial number and password is stored in the authentication database, authentication succeeds; if not stored, authentication fails.

Next, the server-side server software execution unit 401 determines if authentication succeeded (step SB6).

If authentication failed (step SB6: NO), the server-side server software execution unit 401 executes a corresponding process (step SB7). For example, the server-side server software execution unit 401 may send an HTML file indicating authentication failed to the POS terminal 10. Based on the HTML file, the client-function unit 501 of the POS terminal 10 displays an indication that authentication failed on the touch panel TP, thereby informing the user that authentication failed.

If authentication succeeds (step SB6: YES), the server-side server software execution unit 401 generates an access code (step SB8). The access code is information used by the successfully authenticated POS terminal 10 when the POS terminal 10 accesses the control server 15. As described further below, an authenticated POS terminal 10 sends the access code when accessing the control server 15. The control server 15 identifies the POS terminal 10 that sent the access code as a POS terminal 10 that has completed authentication, and allows use of control server 15 functions.

Note that the access code is a unique value.

Next, the server-side server software execution unit 401 relationally stores the access code generated in step SB8 with the corresponding serial number and password in the authentication database (step SB9). Below, the access code relationally stored with the serial number and password in the authentication database is referred to as an "access code for server-side authentication."

Next, the server-side server software execution unit 401 controls the server communication unit 42 to send the access code gated in step SB8 to the POS terminal 10 (step SB10).

As shown in FIG. 3 (A), the client-function unit 501 of the POS terminal 10 controls the control device communication unit 53 to receive the access code (step SA4).

Next, the client-function unit 501 stores the received access code in a specific storage area of nonvolatile memory that can be read by the client-function unit 501 (step SA5).

The operation of the POS terminal 10 when the power is turned on for a POS terminal 10 that has completed authentication is described next.

Figure 5:
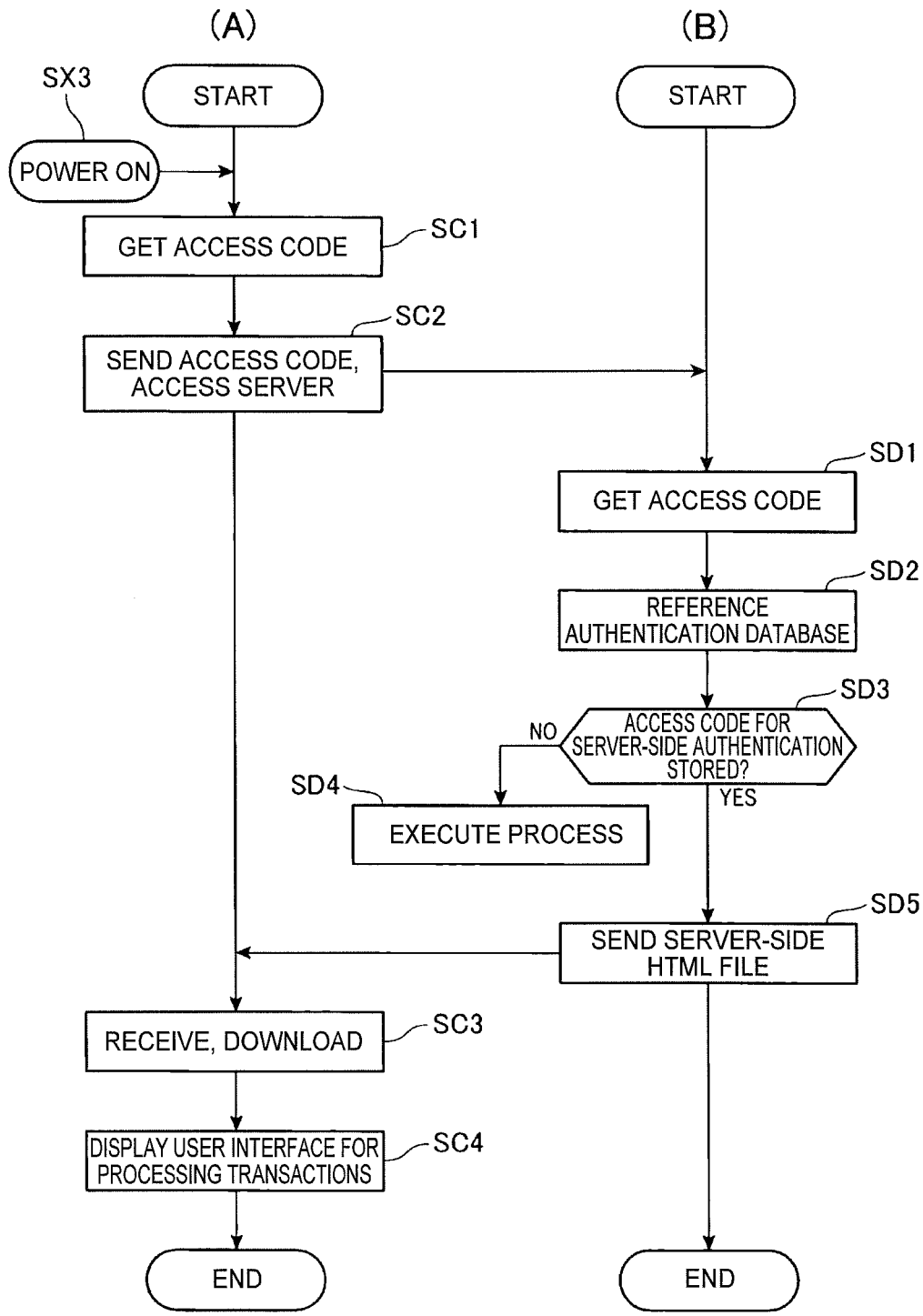
FIG. 5 is a flow chart of an operation of a POS terminal and control server.

FIG. 5 is a flowchart showing the operation of the control server 15 and the POS terminal 10 when a POS terminal 10 that has completed authentication is turned on. FIG. 5 (A) shows the operation of the POS terminal 10, and (B) shows the operation of the control server 15.

The checkout clerk first turns the POS terminal 10 on (step SX3). In this example, the POS terminal 10 is installed at a checkout counter L, and the checkout clerk turns the POS terminal 10 on when the store opens, for example. As described above, the browser starts automatically when the POS terminal 10 turns on.

As shown in FIG. 5 (A), the client-function unit 501 of the POS terminal 10 then acquires the access code stored in a specific storage area (step SC1).

Next, the client-function unit 501 controls the control device communication unit 53 to send the acquired access code and access a specific URL on the control server 15 (step SC2). Note that the access code may be sent by, for example, inserting the access code to an HTTP request, by adding the access code as a parameter to a URL query, or transmitting a specific control command containing the access code. When sending the access code, the access code may be encrypted using a method enabling decryption by the control server 15.

As shown in FIG. 5 (B), the server-side server software execution unit 401 of the control server 15 acquires the access code sent by the POS terminal 10 when accessed by the POS terminal 10 (step SD1).

Next, the server-side server software execution unit 401 references the authentication database described above (step SD2).

Next, the server-side server software execution unit 401 determines if an access code for server-side authentication having the same value as the access code acquired in step SD1 is stored (step SD3). As described above, authentication of the POS terminal 10 is successful if an access code for server-side authentication of the same value as the access code sent by the POS terminal 10 accessing the control server 15 is stored in the authentication database.

If a matching access code for server-side authentication is not stored in the authentication database (step SD3: NO), the server-side server software execution unit 401 executes an appropriate process (step SD4). For example, the server-side server software execution unit 401 may send an HTML file for displaying information indicating that the access code is not valid and a user interface enabling authentication by inputting a serial number and password.

If a matching access code for server-side authentication is stored in the authentication database (step SD3: YES), the server-side server software execution unit 401 controls the server communication unit 42 to send the server-side HTML file 412 to the POS terminal 10 (step SD5). The server-side HTML file 412 is an HTML file for displaying the user interface for processing transactions 60 (FIG. 6) described below.

As shown in FIG. 5 (A), the client-function unit 501 of the POS terminal 10 controls the control device communication unit 53 to receive and acquire the server-side HTML file 412 (step SC3).

Next, the client-function unit 501 runs the acquired server-side HTML file 412 and displays the user interface for processing transactions 60 (FIG. 6) on the touch panel TP (step SC4).

Figure 6:
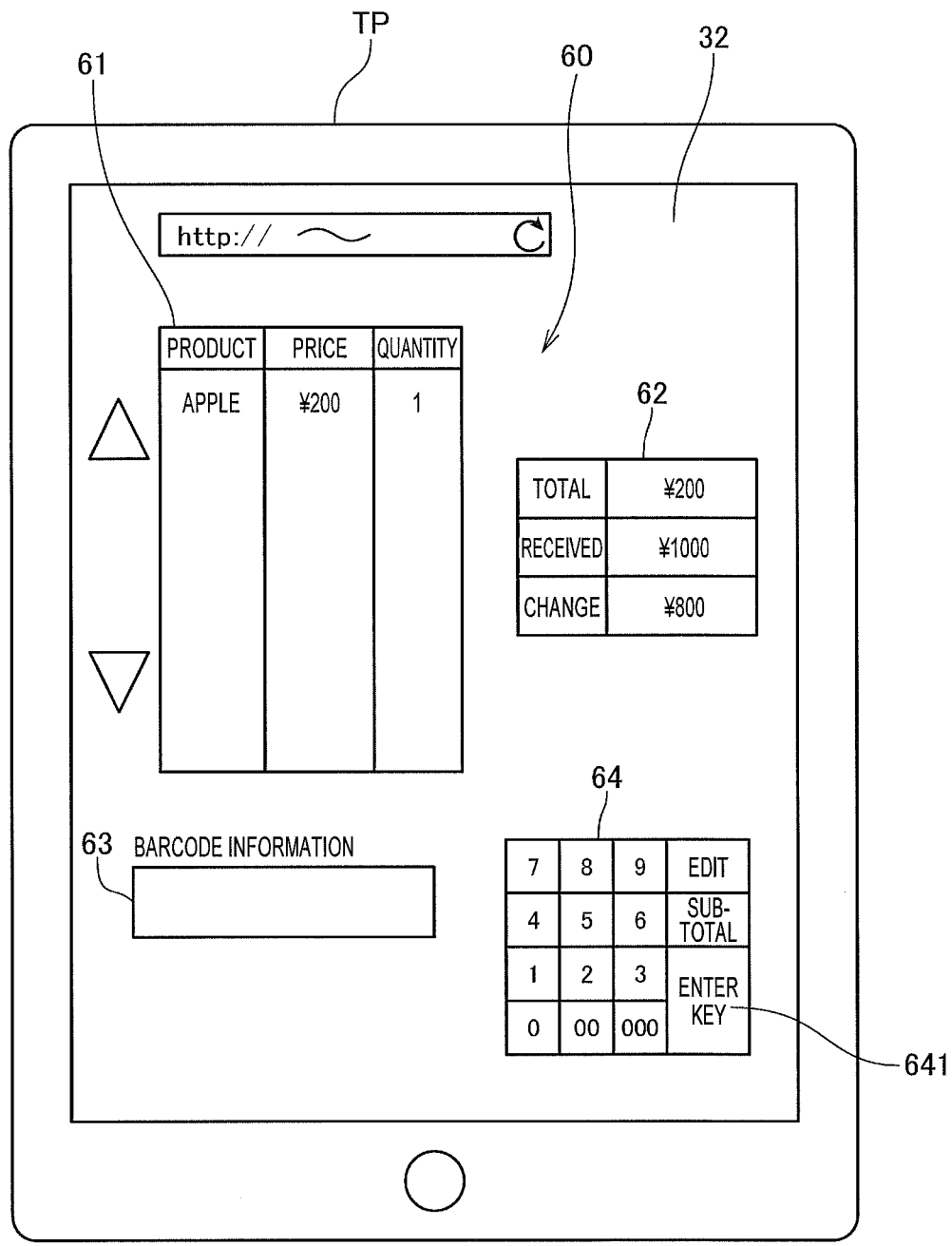
FIG. 6 shows an example of a user interface for a transaction.

FIG. 6 shows an example of a user interface for processing transactions 60 that is displayed on the touch panel TP.

A list display area 61 where the names of the products (product names) being purchased by the customer, the prices of the products, and the quantities of the products are presented in a list is displayed at the top left of the user interface for processing transactions 60 shown in FIG. 6. To the right of this list display area 61 is presented an amount display area 62 where the total amount of the products being purchased by the customer, the amount of money received from the customer in the transaction, and the amount of change due to the customer are displayed.

Below the list display area 61 is a barcode information display area 63 the information (referred to below as barcode information) expressed by the barcode that is read by the barcode scanner BS is displayed. The barcode information is the product code assigned to the product, for example.

A virtual keypad 64 is displayed on the right side of the barcode information display area 63. The virtual keypad 64 includes an Enter key 641 for finalizing the transaction.

The checkout clerk then uses the user interface for processing transactions 60 to process the transaction at the checkout counter L.

As described above, a POS terminal 10 that has been successfully authenticated automatically accesses the control server 15 using the access code when the POS terminal 10 turns on. As a result, when the checkout clerk starts the POS terminal 10 and connects the POS terminal 10 to the control server 15, the checkout clerk does not need to input the serial number and password if the POS terminal 10 is a terminal that has already completed authentication. More specifically, the number of times the checkout clerk must input the serial number and password when connecting the POS terminal 10 to the control server 15 for use is reduced, and user convenience is improved for the checkout clerk.

In the flow chart in FIG. 5, the control server 15 is configured to determine whether or not authentication of a POS terminal 10 that accessed the control server 15 with an access code was completed by determining if there is a corresponding access code for server-side authentication stored in the authentication database, but may be configured as described below.

For example, the control server 15 may determine if the time of access based on the access code is within a predetermined time period, request transmission of the password and serial number if not within this time period, and use the information received based on this request to authenticate the POS terminal 10. This time period is a period when the control server 15 may normally be accessed by the POS terminal 10, such as a period reflecting the opening and closing times of the store where the POS terminal 10 is used.

This can effectively prevent an unauthorized POS terminal 10 from using functions of the control server 15.

The synchronization processor 503 of the control device controller 50 of the POS terminal 10 is described next.

Figure 7:
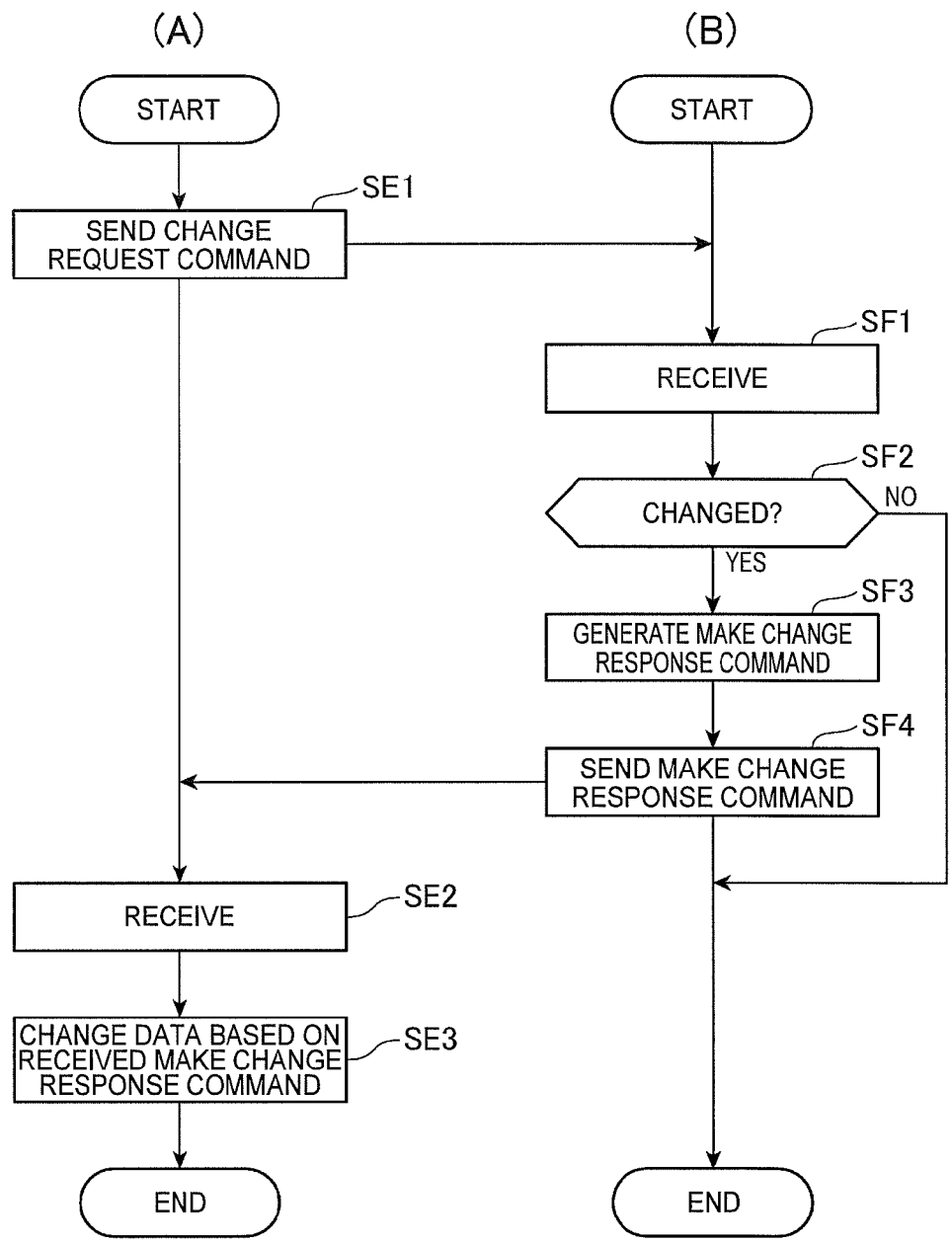
FIG. 7 is a flow chart of an operation of a POS terminal and control server.

FIG. 7 is a flow chart showing the operation of the POS terminal 10 and control server 15 when the synchronization processor 503 executes the synchronization process. FIG. 7 (A) shows the operation of the POS terminal 10, and (B) shows the operation of the control server 15.

The synchronization processor 503 functions to synchronize the server-side product master database 411 stored by the control server 15, and the control device-side product master database 521 stored by the POS terminal 10; synchronize the server-side web application 413 stored by the control server 15, and the control device-side web application 522 stored by the POS terminal 10; and synchronize the access code for server-side authentication stored by the control server 15 with the access code for control device-side authentication (described below) stored by the POS terminal 10.

Below, the server-side product master database 411, server-side web application 413, and access code for server-side authentication stored by the control server 15 are referred to as "server-side data."

The control device-side product master database 521, control device-side web application 522, and access code for control device-side authentication (described below) stored by the POS terminal 10 are referred to as "control device-side data."

As shown in FIG. 7 (A), the synchronization processor 503 controls the control device communication unit 53 to send to the control server 15 a control command (referred to below as a "change request command") querying whether or not a change was made to the server-side data (step SE1). A change request command is a command containing the serial number of the POS terminal 10. Note that the synchronization processor 503 manages communication-related information required to send a change request command, such as the address to access on the control server 15.

The synchronization processor 503 sends the change request command to the control server 15 at a specific interval. The process starting from step SE1 is therefore executed at the specific interval at which the change request command is transmitted.

Note that a change in the server-side data means that content was changed in the server-side product master database 411. A change may also mean that the server-side web application 413 was modified. A change in an access code for server-side authentication may also mean that a new access code for server-side authentication related to a specific serial number was generated in the authentication database, or that an access code for server-side authentication was deleted. An access code for server-side authentication generated and stored in the authentication database by the control server 15 may also be deleted as described below.

As shown in FIG. 7 (B), the server-side server software execution unit 401 of the control server 15 controls the server communication unit 42 to receive the change request command (step SF1).

Next, the server-side server software execution unit 401 determines if a change was made to the server-side data from when a change request command was last received and when the change request command is received in step SF1 (step SF2).

If there was no change to the server-side data (step SF2: NO), the server-side server software execution unit 401 ends the process.

If there was a change to the server-side data (step SF2: YES), the server-side server software execution unit 401 generates a control command (referred to below as a "make change response command") to make the same change in the control device-side data that was made in the server-side data (step SF3).

In step SF3, if a change was made in the content of the server-side product master database 411, the server-side server software execution unit 401 generates a make change response command for making the same change in the control device-side product master database 521 that was made in the server-side product master database 411.

If a change was made in the server-side web application 413, the server-side server software execution unit 401 generates a make change response command to make the same change to the control device-side web application 522 that was made to the server-side web application 413.

If a new access code for server-side authentication was relationally stored in the authentication database for a serial number contained in the change request command, the server-side server software execution unit 401 generates a make change response command to store that access code for server-side authentication (access code). In this event, the access code for server-side authentication (access code) is included in the make change response command. If the access code for server-side authentication related to the serial number contained in the change request command was deleted from the authentication database, the server-side server software execution unit 401 generates a make change response command to delete the access code for control device-side authentication.

As shown in FIG. 7 (A), the synchronization processor 503 of the POS terminal 10 then controls the control device communication unit 53 to receive the make change response command (step SE2).

Next, the synchronization processor 503 changes the control device-side data (step SE3).

If the make change response command is a control command for storing an access code for server-side authentication (access code), the synchronization processor 503 stores the access code for server-side authentication contained in the make change response command to a specific storage area. The storage area where the access code for server-side authentication is stored is a storage area that can be read by the server-function unit 502 but cannot be read by the client-function unit 501. When storing the access code for server authentication in the specific storage area, the access code may be encrypted by a specific means to prevent tampering by a third party.

Below, the access code for server-side authentication stored in the specific storage area based on the make change response command is referred to as the access code for control device-side authentication.

If the make change response command is a control command to delete the access code for control device-side authentication, the synchronization processor 503 deletes the access code for control device-side authentication from the specific storage area.

The server-side data and control device-side data are thus kept synchronized by a function of the synchronization processor 503. More specifically, and an access code for server-side authentication is stored by the control server 15, an access code for control device-side authentication is stored by the POS terminal 10. When an access code for server-side authentication is deleted by the control server 15, the access code for control device-side authentication is deleted by the POS terminal 10.

Note that the means of synchronizing the control device-side product master database 521 and server-side product master database 411 is not limited to the foregoing example. For example, the control server 15 may be configured to send a copy of the updated server-side data, or data describing the difference between the previous server-side data and the updated server-side data, instead of sending a make change response command. Further alternatively, instead of the POS terminal 10 querying the control server 15 about changes to the server-side data, the control server 15 may be configured to send the make change response command, a copy of the updated server-side data, or data describing the difference between the previous server-side data and the updated server-side data when there is a change to the server-side data.

Another process executed by the server-side server software execution unit 401 of the control server 15 is described next.

The server-side server software execution unit 401 determines if the condition for deleting the access code for server-side authentication (referred to below as "access code deletion condition") for the POS terminal 10 that attempted to access the control server 15 was met.

This access code deletion condition is met when there is a possibility that there was an illegal access attempt by the POS terminal 10, and an unauthorized person attempted access.

For example, the access code deletion condition may be that the time when the POS terminal 10 accessed the control server 15 is an unexpected time based on the relationship to the opening and closing times of the store where the POS terminal 10 is used.

Further alternatively, the access code deletion condition may be that the access frequency or access method is not normal. The frequency of access determined to be not normal, and the method of access determined to be not normal, are previously set.

The access code deletion condition may also be that an abnormal transaction process was executed by the POS terminal 10. An abnormal transaction process may be plural payments exceeding an anticipated amount, for example. In this case, the control server 15 has a function for determining for each individual POS terminal 10 if an abnormal transaction process was performed based on the transaction information data described below.

If the access code deletion condition is met for one POS terminal 10, the server-side server software execution unit 401 deletes the access code for server-side authentication related to the serial number of that one POS terminal 10 from the authentication database.

When there is an illegal access attempt from a particular POS terminal 10, the server-side server software execution unit 401 thus deletes the access code for server-side authentication for that one POS terminal 10 from the authentication database. As a result, the POS terminal 10 that may have illegally attempted to access the server is thereafter prevented from accessing the control server 15 using that access code and using functions of the control server 15.

As described above, the POS terminal 10 executes a transaction process according to a transaction performed at the checkout counter L, and creates a record based on the transaction process. The process of creating the record is described in detail below. Specifically, the client-function unit 501 changes the device with which it communicates between the control server 15 and the server-function unit 502 by means of a communication monitoring and switching process described below. When the communication device is set to the control server 15, the client-function unit 501 communicates with the control server 15, executes a transaction-related process with the control server 15, and creates a transaction record. When the communication device is set to the server-function unit 502, the client-function unit 501 communicates with the server-function unit 502, executes a transaction-related process with the server-function unit 502, and creates a transaction record.

The communication monitoring and switching process is described below, and the operation of the POS terminal 10 when communicating with the control server 15 and when communicating with the server-function unit 502 is then described.

Figure 8:
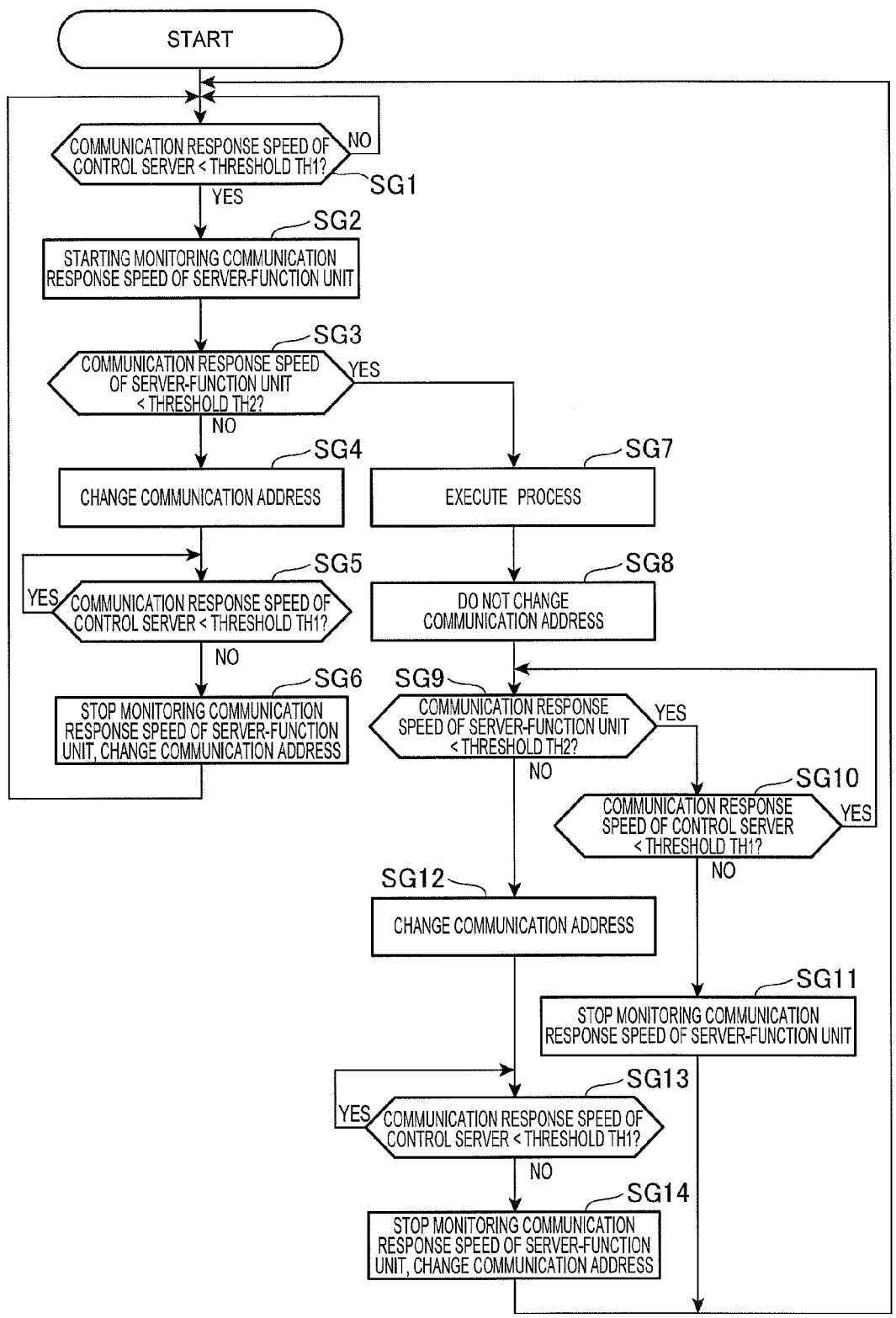
FIG. 8 is a flow chart of an operation of a POS terminal.

FIG. 8 is a flow chart showing the operation of the POS terminal 10 when executing the communication monitoring and switching process.

Note that when the operation shown in FIG. 8 starts, the client-function unit 501 is set to communicate with the control server 15.

After the browser of the POS terminal 10 starts and the server-side HTML file 412 is acquired, the client-function unit 501 executes the following process continuously.

More specifically, the client-function unit 501 sends data related to a response request to the control server 15 at a specific interval. The control server 15 has a function for returning response data when response request data is received. The client-function unit 501 then measures the communication response speed of the control server 15 based on how much time passes until the response data is received after the response request data is sent. As described above, the client-function unit 501 measures how long it takes to receive from the control server 15 a response to the response request data that is transmitted at a specific interval, and thereby monitors the communication response speed of the control server 15. Note that the method of measuring the communication response speed (the method of monitoring the communication response speed) is not limited to the foregoing example, and any appropriate method may be used.

As shown in FIG. 8, the client-function unit 501 monitors whether or not the communication response speed of the control server 15 is less than a specific threshold TH1 (a specific speed) (step SG1). If communication between the ◊POS terminal 10 and the control server 15 is delayed for more than an allowable time, the communication response speed of the control server 15 is below the threshold TH1. The specific threshold TH1 is set based on tests or simulations.

If the communication response speed of the control server 15 is less than the threshold TH1, the client-function unit 501 determines that normal communication with the control server 15 is not possible. More specifically, in this embodiment of the invention, a state in which the POS terminal 10 and control server 15 cannot communicate normally is when the communication response speed of the control server 15 is below the threshold TH1.

If in step SG1 the communication response speed of the control server 15 is below the threshold TH1 (step SG1: YES), the client-function unit 501 starts monitoring the communication response speed of the server-function unit 502 (step SG2).

In this event, when monitoring the communication response speed of the server-function unit 502, the client-function unit 501 outputs response request data to the server-function unit 502 at a specific interval. The server-function unit 502 has a function for returning response data when response request data is received. The client-function unit 501 then measures the communication response speed of the server-function unit 502 based on how much time passes until the response data is received after the response request data is output. As described above, the client-function unit 501 measures how long it takes to receive from the server-function unit 502 a response to the response request data transmitted at a specific interval, and thereby monitors the communication response speed of the server-function unit 502. Note that the method of measuring the communication response speed (the method of monitoring the communication response speed) is not limited to the foregoing example, and any appropriate method may be used.

In this embodiment of the invention, if the communication response speed of the control server 15 is greater than the threshold TH1, the client-function unit 501 does not monitor the communication response speed of the server-function unit 502, but if the communication response speed of the control server 15 is less than the threshold TH1, starts monitoring the communication response speed of the server-function unit 502. If the communication response speed of the control server 15 is greater than the threshold TH1, the addressed device is not changed and remains set to the control server 15, and there is no need to monitor the communication response speed of the server-function unit 502. By thus starting monitoring the communication response speed of the server-function unit 502 conditionally upon the communication response speed of the control server 15 being less than the threshold TH1, the process of unnecessarily monitoring the communication response speed of the server-function unit 502 can be prevented. As a result, the processor load on the POS terminal 10 can be reduced, and processing efficiency can be improved.

After starting monitoring the communication response speed of the server-function unit 502, the client-function unit 501 determines if the communication response speed of the server-function unit 502 is less than a threshold TH2 (step SG3). If communication between the client-function unit 501 and server-function unit 502 is delayed for more than an allowable time, the communication response speed of the server-function unit 502 is below the threshold TH2. The specific threshold TH2 is set based on tests or simulations.

If the communication delay exceeds the allowable range of the communication response speed of the server-function unit 502 (if the communication response speed of the server-function unit 502 is slower than the threshold TH2), there may be an overload on the CPU of the POS terminal 10, or the server-function unit 502 may be running multiple processes. However, because the specifications of the CPU of the POS terminal 10 anticipate the addressee of the client-function unit 501 changing to the server-function unit 502 when normal communication with the control server 15 is not possible, the possibility of a drop in the communication response speed of the server-function unit 502 is extremely low compared with the possibility of a delay in communication with the control server 15. In other words, the possibility of a delay in communication with the control server 15 and communication with the control device controller 50 both exceeding the allowable range is extremely low.

If in step SG3 the communication response speed of the server-function unit 502 is not lower than the threshold TH2 (step SG3: NO), the client-function unit 501 changes the addressed device from the control server 15 to the server-function unit 502 (step SG4).

When the addressed device is changed in step SG4, the client-function unit 501 and server-function unit 502 execute the following process.

More specifically, the client-function unit 501 acquires the access code stored in a specific storage area that can be read by the client-function unit 501, and outputs the acquired access code to the server-function unit 502.

When an access code is input from the client-function unit 501, the server-function unit 502 determines if an access code for control device-side authentication is stored in the specific storage area that can be read by the server-function unit 502.

If an access code for control device-side authentication is not stored, the POS terminal 10 is a terminal that has not completed authentication with the control server 15. As a result, when an access code for control device-side authentication is not stored, the server-function unit 502 does not allow the client-function unit 501 to use functions of the server-function unit 502, and does not execute a process with the client-function unit 501.

If an access code for control device-side authentication is stored, the server-function unit 502 determines if the value of the access code input from the client-function unit 501 and the value of the access code for control device-side authentication match. If the values do not match, the POS terminal 10 is a terminal that has not completed authentication with the control server 15. As a result, if an access code for control device-side authentication is stored but the value of the access code input from the client-function unit 501 and the value of the access code for control device-side authentication do not match, the server-function unit 502 does not allow the client-function unit 501 to use functions of the server-function unit 502, and does not execute a process with the client-function unit 501.

If the value of the access code input from the client-function unit 501 and the value of the access code for control device-side authentication match, the server-function unit 502 does allows the client-function unit 501 to use functions of the server-function unit 502, and thereafter functions as a server to the client-function unit 501 as a client, and executes processes in response to requests from the client-function unit 501.

When changing the addressed communication device from the control server 15, the client-function unit 501 in this embodiment of the invention uses an access code to access the server-function unit 502 and can use functions of the server-function unit 502.

As a result, the client-function unit 501 of a POS terminal 10 that has not completed authentication is prevented from executing processes using functions of the server-function unit 502, and security is maintained. The user also does not need to input the serial number and password to change the addressed device, and user convenience is good.

Note that the same process executed in step SG4 is executed in step SG12 described below to change the addressed communication device.

Next, the client-function unit 501 monitors if the communication response speed of the control server 15 is still slower than the threshold TH1 (step SG5). Note that the threshold used for comparison with the communication response speed of the control server 15 in step SG5 is not limited to threshold TH1, and may be a threshold reflecting the threshold TH1 with a specific margin.

If the communication response speed of the control server 15 has become faster and is greater than the threshold TH1 (step SG5: NO), the client-function unit 501 stops monitoring the communication response speed of the server-function unit 502, changes the device addressed by the client-function unit 501 to the control server 15 (step SG6), and then returns to step SG1.

If in step SG3 the communication response speed of the server-function unit 502 is determined to be slower than threshold TH2 (step SG3: YES), the client-function unit 501 executes a corresponding process (step SG7) and the addressed device does not change (step SG8). In step SG7, the client-function unit 501 displays information on the touch panel TP indicating that the transaction process and associated processes cannot be executed because normal communication with the control server 15 and server-function unit 502 is not possible. By reading the information on the touch panel TP in this event, the user, such as the checkout clerk, can know that a transaction cannot be processed with the POS terminal 10 and why, and based thereon can take action to resolve the problem.

As described above, the client-function unit 501 does not change the addressed device when the communication response speed of the server-function unit 502 is slower than threshold TH2 even if the communication response speed of the control server 15 is slower than threshold TH1. As a result, the addressed server device is not changed unnecessarily.

Next, the client-function unit 501 monitors whether or not the communication response speed of the server-function unit 502 is slower than threshold TH2 (or a threshold reflecting threshold TH2 with a margin) (step SG9), and if the communication response speed of the server-function unit 502 is slower than threshold TH2 (step SG9: YES), monitors if the communication response speed of the control server 15 is still slower than threshold TH1 (or a threshold reflecting threshold TH1 with a margin) (step SG10).

If the communication response speed of the control server 15 is faster than threshold TH1 (step SG10: NO), the client-function unit 501 stops monitoring the communication response speed of the server-function unit 502 (step SG11), and returns to step SG1.

If the communication response speed of the server-function unit 502 becomes faster than threshold TH2 before the communication response speed of the control server 15 becomes faster than threshold TH1 (step SG9: NO), the client-function unit 501 switches communication from the control server 15 to the server-function unit 502 (step SG12).

Next, the client-function unit 501 monitors whether or not the communication response speed of the control server 15 is still slower than the threshold TH1 (or a threshold reflecting threshold TH1 with a margin) (step SG13).

If the communication response speed of the control server 15 is faster than threshold TH1 (step SG13: NO), the client-function unit 501 stops monitoring the communication response speed of the server-function unit 502 and switches communication from the client-function unit 501 to the control server 15 (step SG14), and returns to step SG1.

As described below, when communication is switched to the server-function unit 502, the client-function unit 501 communicates with the control device-side application execution unit 5021 of the server-function unit 502 instead of the server-side application execution unit 4011 of the control server 15, and executes the transaction process and associated processes in conjunction with the control device-side application execution unit 5021. The server-side web application 413 embodying the function of the server-side application execution unit 4011, and the control device-side web application 522 embodying the function of the control device-side application execution unit 5021, are applications with identical functionality, and are synchronized by a specific means. In addition, the server-side product master database 411 used when the server-side application execution unit 4011 executes processes, and the control device-side product master database 521 used when the control device-side application execution unit 5021 of the server-function unit 502 executes processes, contain the same content, and are synchronized by a specific means described below. As a result, the process result of one process the client-function unit 501 executes with the server-side application execution unit 4011, and the result of a process the client-function unit 501 executes with the control device-side application execution unit 5021, are basically the same, and changing the device the client-function unit 501 communicates with does not change the result of the process.

As described above, the client-function unit 501 monitors the communication response speed of the control server 15, determines normal communication with the control server 15 is not possible if the communication response speed is slower than a specific speed, and except in specific circumstances switches communication from the control server 15 to the server-function unit 502.

As a result, the client-function unit 501 switches communication to the server-function unit 502 and can continue running processes (including a transaction process) even when normal communication with the control server 15 is not possible. Business operations are therefore not interrupted. It is also possible to connect a server (substitute server) that can replace the control server 15 to the local area network LN, and the client-function unit 501 could be configured to access the substitute server through the local area network LN when normal communication with the control server 15 is not possible. In this case, however, normal communication with the substitute server may also not be possible due to congestion on the local area network LN or other reason. On the other hand, because the device with which the client-function unit 501 communicates is changed to the server-function unit 502, with which the client-function unit 501 can communicate by interprocess communication and which is part of the same device as the client-function unit 501, instead of to a substitute server connected through a network, these communication problems will not occur, and the possibility of being able to continue normal business operations even when normal communication with the control server 15 is not possible is extremely high.

Note that when normal communication with the control server 15 is possible, the client-function unit 501 in this embodiment of the invention communicates with the control server 15. More specifically, communication between the client-function unit 501 and control server 15 is prioritized over communication with the server-function unit 502. This is for the following reason. Specifically, each POS terminal 10 in the transaction processing system 1 executes processes using data, such as the server-side product master database 411, stored on the control server 15 by functions of the server-side web application 413. This is because identical processes can still be executed when the content of the server-side product master database 411 changes, or when the server-side web application 413 changes, because each POS terminal 10 uses master databases reflecting the most recent content and functions of the program reflecting the most recent changes. Note that the synchronization processor 503 keeps the server-side product master database 411 and the control device-side product master database 521 synchronized, and keeps the server-side web application 413 and control device-side web application 522 synchronized, but there may be a delay between when a change is made to the control device-side data and when the control device-side data and server-side data are synchronized.

As a result, the client-function unit 501 prioritizes communication with the control server 15 over communication with the server-function unit 502.

Transaction Processing when the POS Terminal 10 and Control Server 15 Communicate Normally The operation of devices in the transaction processing system 1 when a transaction is performed at the checkout counter L and the POS terminal 10 can communicate normally with the control server 15 is described next.

Figure 9:
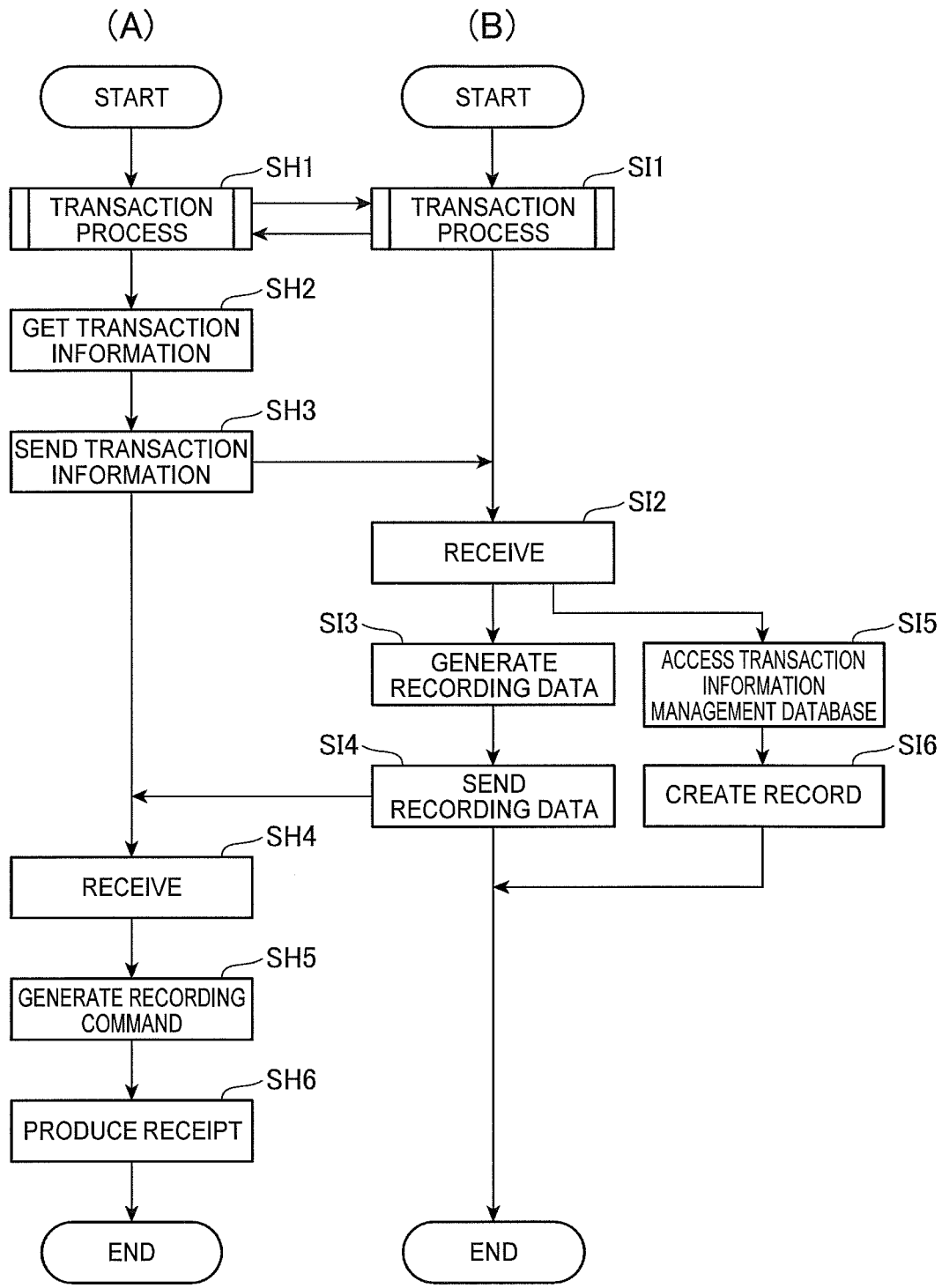
FIG. 9 is a flow chart of an operation of a POS terminal and control server.

In the communication monitoring and switching process described above, the client-function unit 501 determines if normal communication with the control server 15 is possible, and if normal communication is possible, sets the addressed device to the control server 15 and executes the process of the flow chart shown in FIG. 9 (A).

FIG. 9 is a flow chart showing the operation of devices in the transaction processing system 1 during a transaction. Column (A) shows the operation of the POS terminal 10, and (B) shows the operation of the control server 15.

As shown in FIG. 9 (A) and FIG. 9 (B), the POS terminal 10 and control server 15 start the transaction process when a transaction begins (step SH1 and step SI1).

Figure 10:
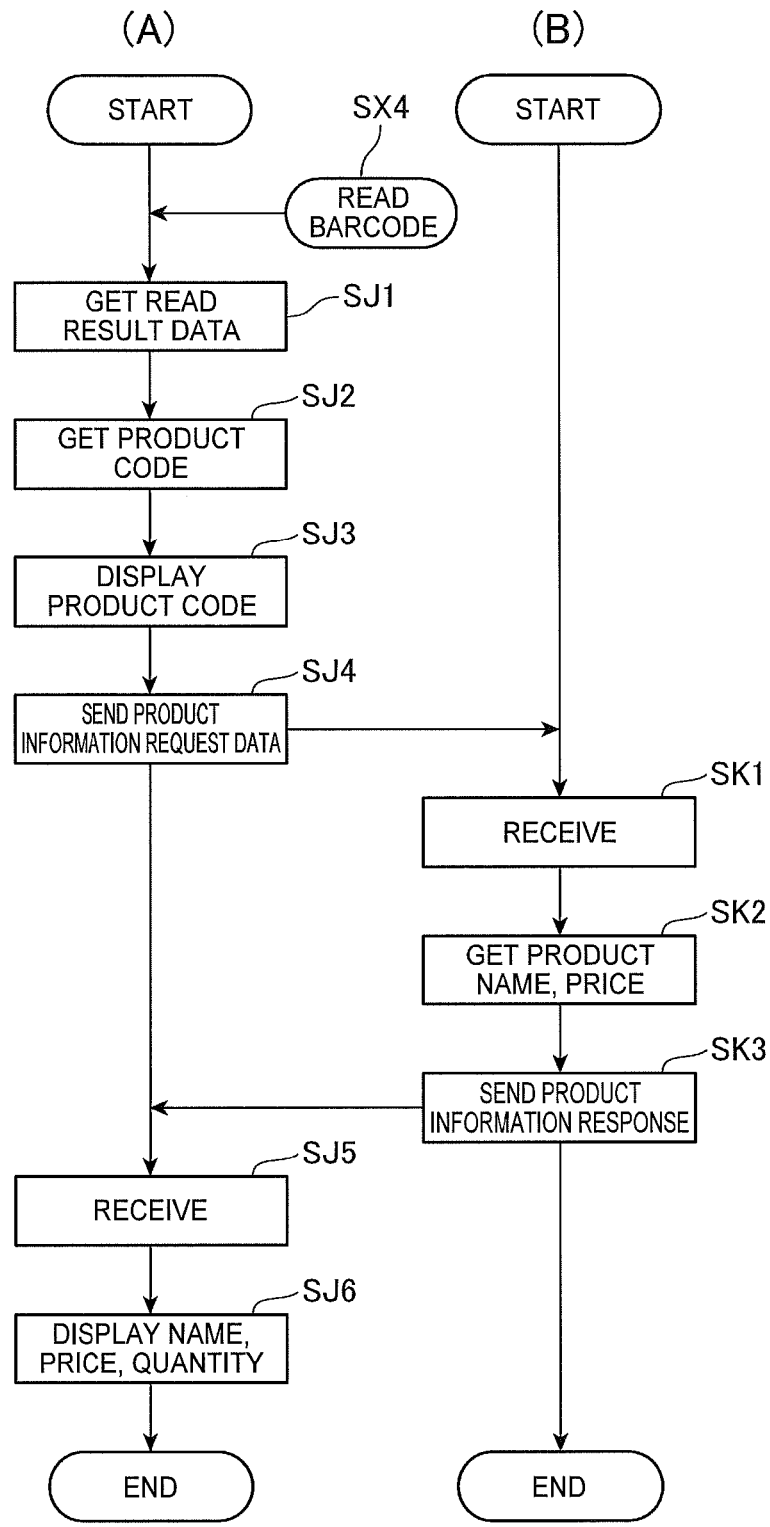
FIG. 10 is a flow chart of an operation of a POS terminal and control server.

FIG. 10 is a flow chart showing part of the process executed by the POS terminal 10 and control server 15 in the transaction process. Column (A) shows the operation of the POS terminal 10, and (B) shows the operation of the control server 15.

In the transaction process, the checkout clerk reads the barcode on the product or the packaging of the product being purchased by the customer with the barcode scanner BS (step SX4). Upon reading a barcode, the barcode scanner BS sends data based on the read result (referred to below as as the "read result data") through the port to which the barcode scanner BS is connected to the control device-side device communication unit 54 of the POS terminal 10. The control device-side device communication unit 54 then outputs the read result data to the control device controller 50.

The read result data is data including information indicating the product code of the product.

As shown in FIG. 10 (A), the client function unit 501 of the control device controller 50 of the POS terminal 10 acquires the read result data based on the input from the control device-side device communication unit 54 (step SJ1).

Next, the client function unit 501 acquires the product code based on the read result data (step SJ2).

Next, the client function unit 501 displays the product code acquired in step SJ2 in the barcode information display area 63 of the user interface for processing transactions 60 (step SJ3).

Next, the client function unit 501 controls the control device communication unit 53 to send the product name for the product code acquired in step SJ2 and data querying the price of the product (referred to below as as product information request data) to the control server 15 (step SJ4).

Note that the client function unit 501 manages the information required to communicate with the control server 15, such as the address of the control server 15 and the corresponding protocol, opens a connection with the control server 15 based on the managed information, and communicates data through the opened connection.

As shown in FIG. 10 (B), the server-side application execution unit 4011 of the server controller 40 of the control server 15 controls the server communication unit 42 to receive the product information request data (step SK1).

Next, based on the received product information request data, the server-side application execution unit 4011 acquires the product code, references the server-side product master database 411 stored by the server storage unit 41, and acquires the name and the price of the product identified by the acquired product code (step SK2).

Next, the server-side application execution unit 4011 controls the server communication unit 42, and sends product information response data expressing the product name and price information acquired in step SK2 to the POS terminal 10 (step SK3).

As shown in FIG. 10 (A), the client function unit 501 of the control device controller 50 of the POS terminal 10 controls the control device communication unit 53 to receive the product information response data (step SJ5).

Next, the client function unit 501 acquires the product name and product price based on the received product information response data, and displays the name, price, and quantity of the product in the corresponding fields of the list display area 61 in the user interface for processing transactions 60 (step SJ6).

As described above, during a transaction, the checkout clerk reads the barcode with the barcode scanner BS from each product being purchased by the customer, and the POS terminal 10 and control server 15 execute the process shown in the flow chart in FIG. 10 based on the read barcode.

When reading the barcode from every product and processing by each device based on the read barcode is completed, the name, price, and quantity of each product being purchased by the customer is displayed in the list display area 61.

When the barcode of every product has been read, the checkout clerk uses the virtual keypad 64 to confirm the transaction total, receives payment from the customer, and makes change as due. The client function unit 501 of the control device controller 50 of the POS terminal 10 then appropriately displays the total of the products purchased by the customer, the amount received from the customer for the transaction, and the change due to the customer in the amount display area 62 of the user interface for processing transactions 60. The client function unit 501 also controls the customer display CD appropriately to display information related to the transaction on the customer display CD. The client function unit 501 also controls the cash drawer KS appropriately to open the tray of the cash drawer KS.

When change has been given to the customer, the checkout clerk presses the Enter key 641 of the virtual keypad 64 of the user interface for processing transactions 60. The transaction process ends when the checkout clerk operates the Enter key 641.

As shown in FIG. 9 (A), when the transaction process ends, the client function unit 501 of the control device controller 50 of the POS terminal 10 acquires the transaction information (step SH2).

The transaction information is information including: identification information uniquely assigned to each transaction (referred to below as transaction identification information); information denoting the combination of product code, name, price, and quantity for each product purchased by the customer (referred to below as the purchased product information); information denoting the total purchase amount, cash amount received from the customer, and change returned to the customer (referred to below as transaction amount information); information denoting the time of the transaction (referred to below as as the transaction time information); and the store ID, which is identification information for the store (business) where the transaction was completed.

Note that during a transaction, the client function unit 501 stores information contained the purchased product information and information contained in the transaction amount information to specific storage areas. In step SI2, the client function unit 501 acquires purchased product information and transaction amount information based on the information stored to the specific storage areas.

The time that the transaction was performed as indicated by the transaction time information is the time when the Enter key 641 was operated. The time that the transaction was performed as indicated by the transaction time information is not limited to the time that the Enter key 641 was operated, and may be any time derived from the transaction, such as the time when the barcode for the first product was read in the transaction.

The client function unit 501 also has a function for generating transaction identification information for each transaction, and generates the transaction identification information using this function. The value of the transaction identification information is unique to each transaction performed in each store.

After acquiring the transaction information, the client function unit 501 controls the control device communication unit 53 to send transaction information data expressing the acquired transaction information to the control server 15 (step SH3).

As shown in FIG. 9 (B), the server-side application execution unit 4011 of the server controller 40 of the control server 15 controls the server communication unit 42 to receive the transaction information data (step SI2).

Next, the server-side application execution unit 4011 generates recording data for producing a receipt in a specific layout based on the transaction information indicated by the received transaction information data (step SI3).

The recording data is control data specifying producing a receipt according to a specific layout, and including in this example a top logo, bottom logo, transaction identification information, the time of the transaction, the name, price, quantity and total amount of the products purchased by the customer, the amount received from the customer, and the amount of change due to the customer. The recording data in this embodiment is an XML document of information written in a specific XML format.

Next, the server-side application execution unit 4011 controls the server communication unit 42 to send the generated recording data to the POS terminal 10 (step SI4).

As shown in FIG. 9 (A), the client function unit 501 of the control device controller 50 of the POS terminal 10 controls the control device communication unit 53 to receive the recording data (step SH4).

Next, the client function unit 501, based on the recording data in the XML document, generates recording commands in the command language of the control device recording unit 51 (step SH5).

Next, the client function unit 501, based on the generated recording commands, controls the control device recording unit 51 to produce a receipt (step SH6).

The receipt produced in step SH4 is then given by the checkout clerk to the customer.

As shown in FIG. 9 (B), after the transaction information data is received in step SI2, the server-side application execution unit 4011 of the server controller 40 of the control server 15 accesses the transaction information management database 414 stored by the server storage unit 41 (step SI5).

Each record in the transaction information management database 414 relationally stores the purchased product information, transaction amount information, transaction time information, and store ID.

Next, based on the transaction information data received in step SI2, a record relating the transaction identification information, purchased product information, transaction amount information, transaction time information, and store ID is created in the transaction information management database 414 (step SI6).

The control server 15 thus cumulatively stores transaction information appropriate to the transaction. As a result, the control server 15 can manage sales by store and sales by individual product in each store.

Transaction Processing when the POS Terminal 10 and Control Server 15 Cannot Communicate Normally The operation of the POS terminal 10 when a transaction is performed at the checkout counter L and the POS terminal 10 cannot communicate normally with the control server 15 is described next.

Figure 11:
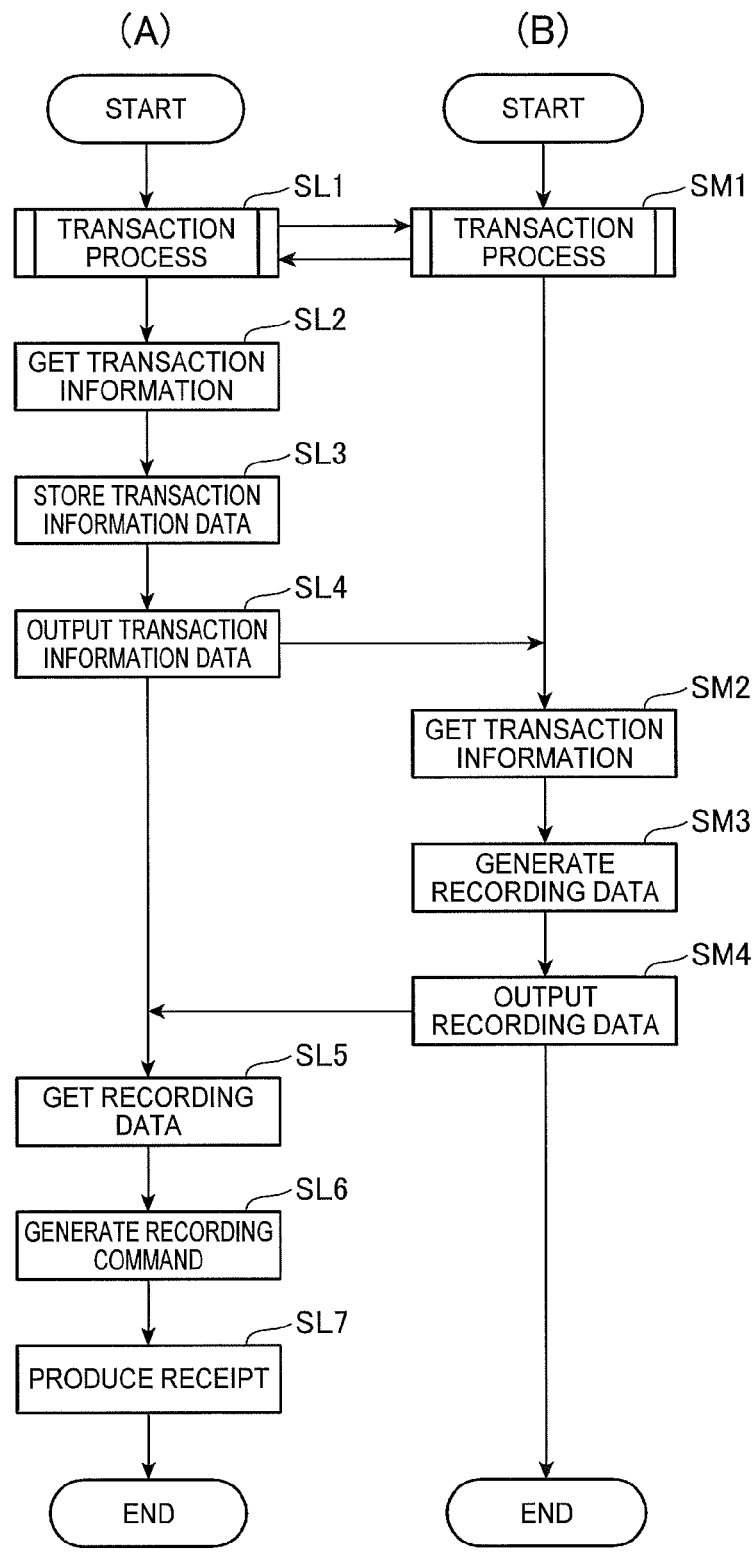
FIG. 11 is a flow chart of an operation of a POS terminal.

The client-function unit 501 determines if normal communication with the control server 15 is possible in the communication monitoring and switching process described above, and if normal communication is not possible, sets the addressed device to the server-function unit 502 and executes the process of the flow chart shown in FIG. 11 (A).

FIG. 11 is a flowchart showing the operation of the POS terminal 10 when communication with the control server 15 is not possible, (A) showing the operation of the client function unit 501, and (B) showing the operation of the server-function unit 502 (including the control device-side application execution unit 5021).

When the process shown in the flow chart in FIG. 11 starts, acquisition of the server-side HTML file 412 by the client function unit 501 of the POS terminal 10 has completed. More specifically, the process of the flow chart shown in FIG. 11 is based on the POS terminal 10 and control server 15 being not able to communicate normally with each other for some reason after the client function unit 501 has acquired the server-side HTML file 412.

Note that a configuration that stores a HTML file synchronized by some means with the server-side HTML file 412 in the POS terminal 10, and retrieves the stored HTML file when the client function unit 501 cannot acquire the server-side HTML file 412 from the control server 15 because the client function unit 501 cannot communicate normally with the control server 15 is also conceivable.

As shown in FIG. 11 (A) and FIG. 11 (B), the client function unit 501, and the control device-side application execution unit 5021 of the server-function unit 502, start the transaction process when a transaction begins (step SL1 and step SM1).

Figure 12:
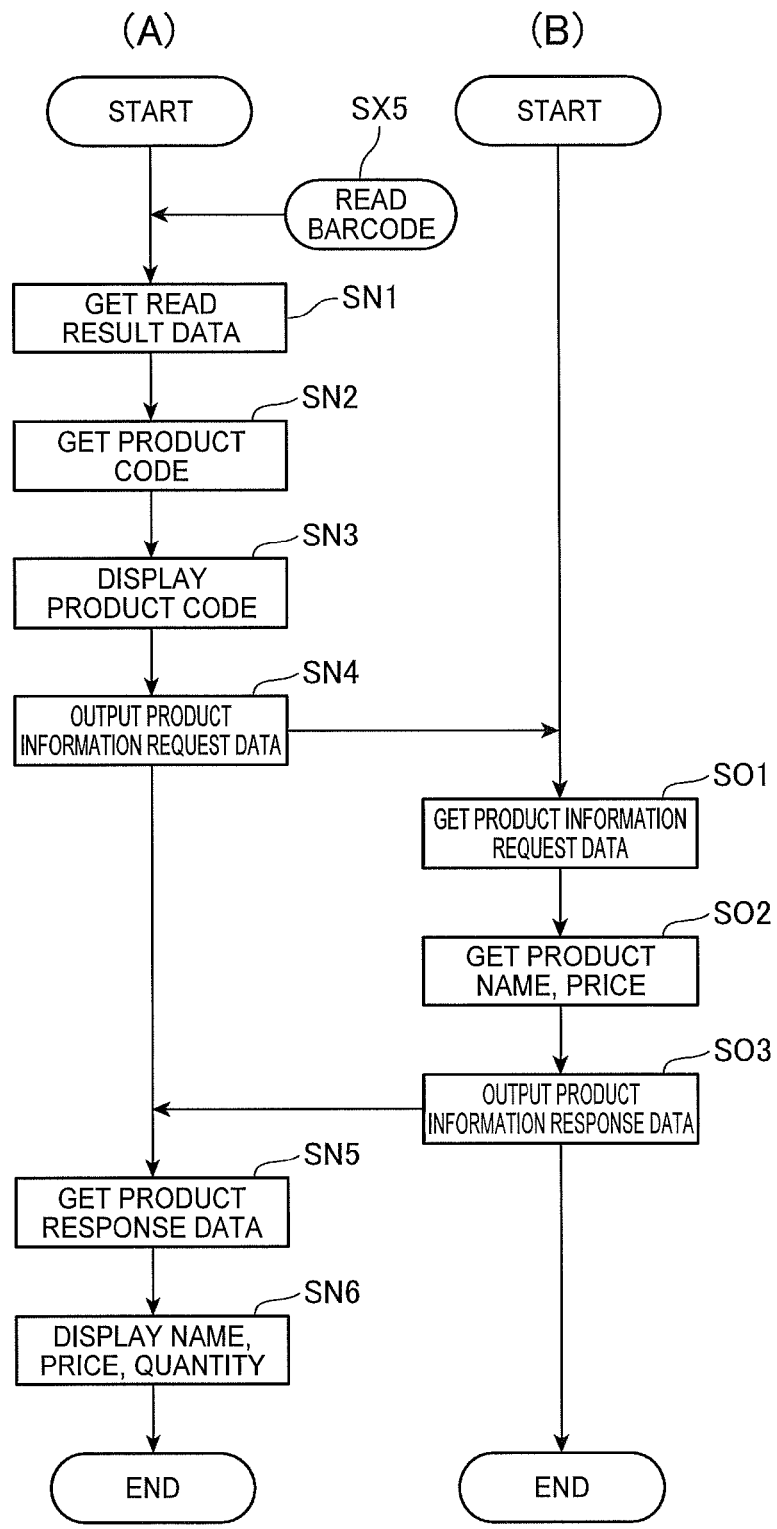
FIG. 12 is a flow chart of an operation of a POS terminal.

FIG. 12 is a flow chart showing part of the process executed by the client function unit 501 and the control device-side application execution unit 5021 in the transaction process, (A) showing the operation of the client function unit 501, and (B) showing the operation of the control device-side application execution unit 5021 of the server-function unit 502.

When the transaction process starts, the checkout clerk reads the barcode from the product or the packaging of the product being purchased by the customer with the barcode scanner BS (step SX5). When a barcode is read, the barcode scanner BS outputs the read result data through the port to which the barcode scanner BS is connected to the control device-side device communication unit 54 of the POS terminal 10. The control device-side device communication unit 54 then outputs the read result data to the control device controller 50. As described above, the read result data is data containing information indicating the product code of the product.

As shown in FIG. 12 (A), the client function unit 501 of the control device controller 50 of the POS terminal 10 acquires the read result data based on the input from the control device-side device communication unit 54 (step SN1).

Next, the client function unit 501 acquires the product code based on the read result data (step SN2).

Next, the client function unit 501 displays the product code acquired in step SN2 in the barcode information display area 63 of the user interface for processing transactions 60 (step SN3).

Next, the client function unit 501 controls the control device communication unit 53 to output product information request data querying the name and the price of the product identified by the product code acquired in step SN2 to the control device-side application execution unit 5021 (step SN4).

As shown in FIG. 12 (B), the control device-side application execution unit 5021 acquires the product information request data input from the client function unit 501 (step SO1).

Next, the control device-side application execution unit 5021 acquires the product code based on the acquired product information request data, references the control device-side product master 521 stored by the control device storage unit 52, and acquires the name and price of the product identified by the acquired product code (step SO2).

As described above, the control device-side product master database 521 and the server-side product master database 411 are kept synchronized by a function of the synchronization processor 503.

Next, the control device-side application execution unit 5021 outputs the product information response data denoting the product name and product price information acquired in step SO2 to the client function unit 501 (step SO3).

As shown in FIG. 12 (A), the client function unit 501 acquires the product information response data input from the control device-side application execution unit 5021 (step SN5).

Next, the client function unit 501 acquires the product name and price data based on the received product information response data, and displays the combination of name, price, and quantity information for the product in the appropriate fields of the list display area 61 in the user interface for processing transactions 60 (step SN6).

As shown in FIG. 11 (A), the client function unit 501 acquires the foregoing transaction information when the transaction process ends (step SL2).

Next, the client function unit 501 stores (records) the transaction information data representing the transaction information acquired in step SN2 in the temporary transaction information database 524 of the control device storage unit 52 (step SL3).

The temporary transaction information database 524 is a database that cumulatively temporarily stores transaction information data based on the transaction process executed by the POS terminal 10 when the control server 15 and POS terminal 10 cannot communicate with each other.

As described further below, after the client function unit 501 can communicate again with the control server 15, it sends the transaction information data cumulatively stored in the temporary transaction information database 524 to the control server 15. After sending the transaction information data to the control server 15, the client function unit 501 deletes the transmitted transaction information data from the temporary transaction information database 524.

After storing the transaction information in step SN3, the client function unit 501 outputs the transaction information data to the control device-side application execution unit 5021 (step SL4).

As shown in FIG. 11 (B), the control device-side application execution unit 5021 then acquires the transaction information data input from the client function unit 501 (step SM2).

Next, the control device-side application execution unit 5021 generates recording data for producing a receipt based on the transaction information described by the transaction information data acquired in step SM2 (step SM3). This recording data is an XML document of information written in a specific XML format.

Next, the control device-side application execution unit 5021 outputs the generated recording data to the client function unit 501 (step SM4).

As shown in FIG. 11 (A), the client function unit 501 acquires the recording data input from the control device-side application execution unit 5021 (step SL5).

Next, the client function unit 501 generates recording commands in a command language appropriate to the control device recording unit 51 based on the recording device data in the XML document (step SL6).

Next, the client function unit 501 controls the control device recording unit 51 to produce a receipt based on the generated recording commands (step SL7).

The receipt produced in step SL7 is then given by the checkout clerk to the customer.

As described above, when the POS terminal 10 cannot communicate normally with the control server 15, the POS terminal 10 processes transactions using the locally stored control device-side product master 521 instead of using the server-side product master database 411 on the control server 15. As a result, the POS terminal 10 can run the transaction process even when the POS terminal 10 and control server 15 cannot communicate with each other, and the user can continue normal business operations.

Operation of the POS terminal 10 and control server 15 after communication is re-enabled from a state in which the POS terminal 10 and control server 15 cannot communicate normally with each other is described next.

Figure 13:
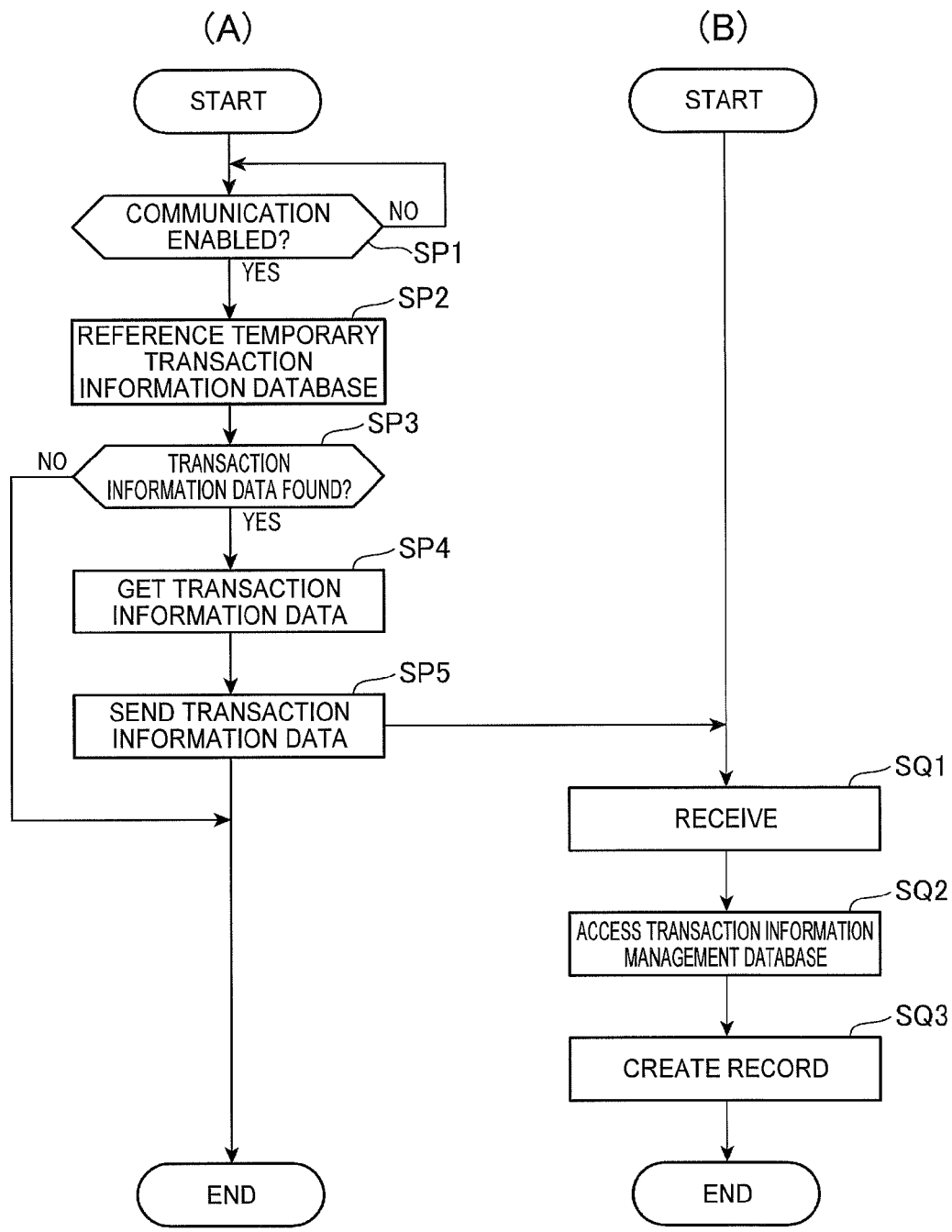
FIG. 13 is a flow chart of an operation of a POS terminal and control server.

FIG. 13 is a flow chart of the operation of the POS terminal 10 and the control server 15 when the POS terminal 10 and control server 15 cannot communicate with each other and communication therebetween is then re-enabled. FIG. 13 (A) shows the operation of the POS terminal 10, and (B) shows the operation of the control server 15. Note that when the flowchart shown in FIG. 13 (A) starts, communication between the POS terminal 10 and the control server 15 is not possible.

As shown in FIG. 13 (A), when communication with control server 15 is disabled, the client function unit 501 of the POS terminal 10 monitors by a specific means if communication with the control server 15 has been enabled again (step SP1).

If communication with the control server 15 is possible (step SP1: YES), the client function unit 501 references the temporary transaction information database 524 (step SP2).

Next, the client function unit 501 determines if new transaction information data has been stored (registered) in the temporary transaction information database 524 (step SP3).

If at least one record of transaction information data was stored in the temporary transaction information database 524, a transaction was performed at the checkout counter L where the POS terminal 10 is located and the POS terminal 10 ran the transaction process while communication with the control server 15 was disabled.

If at least one record of transaction information data was not stored in the temporary transaction information database 524, a transaction was not performed at the checkout counter L where the POS terminal 10 is located while communication with the control server 15 was disabled.

If at least one record of transaction information data was not stored in the temporary transaction information database 524 (step SP3: NO), the client function unit 501 ends the process.

If at least one record of transaction information data was stored in the temporary transaction information database 524 (step SP3: YES), the client function unit 501 acquires all transaction information data stored in the database (step SP4).

Next, the client function unit 501 controls the control device communication unit 53 and sends all acquired transaction information data to the control server 15 (step SP5).

As shown in FIG. 13 (B), the server-side application execution unit 4011 of the server controller 40 of the control server 15 controls the server communication unit 42 to receive the transaction information data (if there is more than one record of transaction information data, each of the plural transaction information data records) (step SQ1).

Next, the server-side application execution unit 4011 accesses the transaction information management database 414 stored by the server storage unit 41 (step SQ2).

Next, based on each transaction information data record received in step SQ1, the server-side application execution unit 4011 creates a record in the transaction information management database 414 relationally storing the transaction identification information, purchased product information, transaction amount information, transaction time information, and store ID (if there were plural records of transaction information data, creates a record for each transaction information data record) (step SQ3).

As described above, transaction information data based on transactions that are performed while the POS terminal 10 cannot communicate normally with the control server 15 is cumulatively stored in the POS terminal 10, and is sent to the control server 15 after communication with the control server 15 is enabled again. Based on the received transaction information data, the control server 15 updates the transaction information management database 414. As a result, even when the POS terminal 10 and control server 15 cannot communicate, a record corresponding to the transaction information data based on the performed transaction is created without fail in the transaction information management database 414 of the control server 15.

As described above, a transaction processing system 1 (network system) according to this embodiment of the invention includes a control server 15 with a server function that connects to a global network GN, and a POS terminal 10 capable of communicating with the control server 15 through the global network GN.

The control server 15 authenticates the POS terminal 10 based on authentication information (a serial number and password combination) received from the POS terminal 10 in response to an authentication request from the POS terminal 10, and if authentication is successful, generates and sends an access code to the POS terminal 10 and stores the access code as an access code for server-side authentication.

The POS terminal 10 has a server-function unit 502 with a server function, a synchronization processor 503, and a client-function unit 501.

The synchronization processor 503 communicates with the control server 15, acquires an access code generated by the control server 15, stores the acquired access code as an access code for control device-side authentication in a storage area that can be read by the server-function unit 502, and communicates with the control server 15 to synchronize the access code for server-side authentication and the access code for control device-side authentication.

The client-function unit 501 sends authentication information to the control server 15 and requests authentication, and acquires and stores the access code generated by the control server 15 if authentication is successful. When normal communication with the control server 15 is possible, the client-function unit 501 communicates with the control server 15 as a client of the control server 15, and executes a process with the control server 15. When normal communication with the control server 15 is not possible, the client-function unit 501 communicates with the server-function unit 502 as a client of the server-function unit 502 based on the stored access code, and executes a process with the server-function unit 502.

Thus comprised, after authentication by the control server 15 is successful, the client-function unit 501 of the POS terminal 10 accesses the control server 15 and executes processes with the control server 15 when normal communication with the control server 15 is possible based on the access code generated by the control server 15 when authentication is successful. When normal communication with the control server 15 is not possible, the client-function unit 501 continues processing by accessing the server-function unit 502 and executing processes in conjunction with the server-function unit 502.

Thus comprised, the POS terminal 10 can appropriately handle cases in which normal communication with the control server 15 is not possible in a system having a control server 15 and a POS terminal 10 connected through a global network GN with the control server 15.

When the control server 15 is illegally accessed by a POS terminal 10, or when the POS terminal 10 executes an illegal process, the control server 15 in this embodiment of the invention deletes the stored access code for server-side authentication.

Thus comprised, a POS terminal 10 illegally accessing the server, and a POS terminal 10 that executed an illegal process, can be prevented from executing processes using a function of the control server 15, and security can be improved.

When the control server 15 is accessed by the POS terminal 10 based on an access code during a specific time period, the control server 15 determines if authentication of the POS terminal has been completed based on the access code. If the control server 15 is accessed from the POS terminal 10 with the access code outside this specific time period, the POS terminal 10 is requested to send authentication information (such as a serial number and password combination).

Thus comprised, a POS terminal 10 that may be attempting to illegally access the server can be prevented from executing processes using a function of the control server 15.

In this embodiment of the invention the POS terminal 10 has a recording function for recording on roll paper (recording media), and produces receipts based on the transaction processes. The client-function unit 501 of the POS terminal 10 communicates with the control server 15 or the server-function unit 502 to execute the transaction process and produce a receipt.

Thus comprised, a system having a POS terminal 10 capable of producing receipts based on sales transactions, and a control server 15 connected to the POS terminal 10 through a global network GN, can appropriately handle events in which the POS terminal 10 and control server 15 cannot communicate normally with each other.

The invention is described above with reference to a preferred embodiment thereof, but the invention is not limited thereto and can be modified and adapted in many ways without departing from the scope of the accompanying claims.

For example, the POS terminal 10 in the foregoing embodiment has a recording function for recording on recording media, and the POS terminal 10 produces receipts based transaction processes. However, a configuration in which a recording device with a recording function is connected to the POS terminal 10, and receipts are produced by the recording device, is also conceivable.

Server-side data and control device-side data are as examples in the foregoing embodiment, but the invention is not so limited and can be applied to any data that requires synchronization.

An example of the transaction processing system 1 according to the invention applied to a store system is described above, but the facilities in which the transaction processing system 1 is used are not limited to stores.

The devices of the transaction processing system 1 may also communicate using any desirable method.

In addition, the POS terminal 10 records by a thermal recording method in the foregoing example, but the recording method is not so limited.

The function blocks described above with reference to the figures can be embodied as desired by the cooperation of hardware and software, and do not suggest a specific hardware configuration.

The function blocks shown in the accompanying function block diagrams illustrate the functional configurations of the devices, but the specific embodiments thereof are not so limited. More specifically, there is no requirement for hardware embodiments of the function blocks shown in the figures, and a configuration in which the functions of plural functional parts are rendered by a single processor executing one or more programs is obviously conceivable. Some functions embodied by software in the foregoing embodiment may also alternatively be embodied by hardware, and some functions embodied by hardware in the foregoing embodiment may also alternatively be embodied by software.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A network system comprising:
    a control server with a server function that connects to a global network; and
    a control device configured to communicate with the server through the global network;
    wherein the control server is configured to authenticate the control device based on authentication information received from the control device in response to an authentication request from the control device, and if authentication is successful, generate and send an access code to the control device, and store the access code as an access code for server-side authentication;
    wherein the control device comprises:
        a server-function unit with a server function,
        a synchronization processor configured to communicate with the control server, acquire an access code generated by the control server, store the acquired access code as an access code for control device-side authentication in a storage area that can be read by the server-function unit, and communicate with the control server to synchronize the access code for server-side authentication and the access code for control device-side authentication, and a client-function unit configured to:
send authentication information to the control server and request authentication, and acquire and store the access code generated by the control server if authentication is successful, when normal communication with the control server is possible, communicate with the control server as a client of the control server based on the stored access code and execute a process with the control server, and when normal communication with the control server is not possible, communicate with the server-function unit as a client of the server-function unit based on the stored access code, and execute a process with the server-function unit;

wherein the control device comprises a control device controller comprising a central processing unit, the control device controller being configured to function as the server-function unit, the synchronization processor, and the client function unit; and wherein the control server is configured such that:
when accessed by the control device based on an access code during a specific time period, the control server determines if authentication of the control device has been completed based on the access code, and when accessed from the control device with the access code outside the specific time period, the control server requests the control device to send authentication information.

2. The network system described in claim 1, wherein:
when illegally accessed by a control device, or when the control device executes an illegal process, the control server deletes the stored access code for server-side authentication.

3. The network system described in claim 1, wherein:
the control device has a recording function for recording on recording media; and
the client-function unit of the control device communicates with the control server or the server-function unit to execute the transaction process and produce a receipt.

4. The network system described in claim 1, wherein:
a recording device with a recording function to record on recording media is connected to the control device; and
the client-function unit of the control device communicates with the control server or the server-function unit to execute the transaction process and causes the recording device to produce a receipt.

5. A method of controlling a network system comprising a control server with a server function that connects to a global network, and a control device configured to communicate with the server through the global network and comprising a client-function unit, a server-function unit, and a synchronization processor, the control method comprising steps of:

the client-function unit of the control device sending authentication information to the control server and requesting authentication;

the control server authenticating the control device based on authentication information received from the control device in response to an authentication request from the control device, and if authentication is successful, generating and sending an access code to the control device, and storing the access code as an access code for server-side authentication;

the client-function unit of the control device acquiring and storing the access code generated by the control server if authentication is successful;

the synchronization process of the control device communicating with the control server, acquiring the access code generated by the control server, storing the acquired access code as an access code for control device-side authentication in a storage area that can be read by the server-function unit, and communicating with the control server to synchronize the access code for server-side authentication and the access code for control device-side authentication;

when normal communication with the control server is possible, the client-function unit of the control device communicating with the control server as a client of the control server based on the stored access code and executing a process with the control server;

when normal communication with the control server is not possible, communicating with the server-function unit as a client of the server-function unit having a server function based on the stored access code, and execute a process with the server-function unit;

wherein the control device comprises a control device controller comprising a central processing unit, the control device controller being configured to function as the server-function unit, the synchronization processor, and the client function unit; and wherein the method further comprises:
the control server, when accessed by the control device based on an access code during a specific time period, determining if authentication of the control device has been completed based on the access code, and the control server, when accessed from the control device with the access code outside the specific time period, requesting the control device to send authentication information.

6. A control device comprising:
a server-function unit with a server function;
a client-function unit configured to send authentication information to a control server connected to a global network and request authentication, and acquire and store an access code generated by the control server if authentication is successful; and
a synchronization processor configured to communicate with the control server, acquire an access code generated by the control server, store the acquired access code as an access code for control device-side authentication in a storage area that can be read by the server-function unit, and communicate with the control server to synchronize an access code managed by the control server with the access code for control device-side authentication;

wherein, when normal communication with the control server is possible, the client-function unit communicates with the control server as a client of the control server based on the stored access code and executes a process with the control server;

wherein, when normal communication with the control server is not possible, the client-function unit communicates with the server-function unit as a client of the server-function unit based on the stored access code, and executes a process with the server-function unit;

wherein the control device comprises a control device controller comprising a central processing unit, the control device controller being configured to function as the server-function unit, the synchronization processor, and the client function unit; and wherein the control device is configured such that:
   when the control device accesses the control server based on an access code during a specific time period, the control device completes authentication based on the access code, and
   when the control device accesses the control server outside the specific time period, the control device sends authentication information to the control server in response to a request from the control server.

* * * * *